(12) United States Patent
Park et al.

(10) Patent No.: US 9,300,517 B2
(45) Date of Patent: Mar. 29, 2016

(54) METHOD AND APPARATUS FOR TRANSMITTING/RECEIVING SIGNAL IN COMMUNICATION SYSTEM

(71) Applicant: Samsung Electronics Co., Ltd., Suwon-si, Gyeonggi-do (KR)

(72) Inventors: Jeong-Ho Park, Seoul (KR); Tae-Young Kim, Seongnam-si (KR); Won-Il Roh, Yongin-si (KR); Min Sagong, Suwon-si (KR); Ji-Yun Seol, Seongnam-si (KR); Hyun-Kyu Yu, Yongin-si (KR); Kyung-Whoon Cheun, Seoul (KR); Jae-Weon Cho, Seongnam-si (KR); Sung-Nam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 14/139,173

(22) Filed: Dec. 23, 2013

(65) Prior Publication Data
US 2014/0177756 A1 Jun. 26, 2014

(30) Foreign Application Priority Data

Dec. 21, 2012 (KR) .................. 10-2012-0150386

(51) Int. Cl.
*H04L 25/03* (2006.01)
*H04L 25/49* (2006.01)
*H04L 27/34* (2006.01)
*H04K 1/02* (2006.01)
*H04L 27/10* (2006.01)

(52) U.S. Cl.
CPC ............. *H04L 27/3405* (2013.01); *H04L 27/10* (2013.01); *H04L 27/34* (2013.01)

(58) Field of Classification Search
CPC ..... H04L 27/0004; H04L 27/10; H04L 27/18; H04L 27/3405; H04L 27/34; H03B 21/00; H03C 3/00
See application file for complete search history.

(56) References Cited

U.S. PATENT DOCUMENTS

| | | | |
|---|---|---|---|
| 6,285,881 B1 | 9/2001 | Huang | |
| 2001/0056350 A1* | 12/2001 | Calderone ............ | G06Q 20/102 704/270 |
| 2003/0016622 A1* | 1/2003 | McCarty, Jr. ....... | H04L 27/2602 370/207 |
| 2006/0115014 A1 | 6/2006 | Jeong et al. | |
| 2009/0060094 A1 | 3/2009 | Jung et al. | |
| 2010/0136933 A1 | 6/2010 | Rofougaran | |

(Continued)

OTHER PUBLICATIONS

Fadel F. Digham and Mohamed-Slim Alouini, Adaptive Hybrid MFSK MQAM Modulation, University of Minnesota, Minneapolis, MN 55455, USA, Aug. 2003.

(Continued)

*Primary Examiner* — Ted Wang
(74) *Attorney, Agent, or Firm* — Jefferson IP Law, LLP

(57) ABSTRACT

A method for transmitting a signal by a signal transmission apparatus in a communication system is provided. The method includes detecting a parameter related to a Quadrature Amplitude Modulation (QAM) scheme and a parameter related to a Frequency Shift Keying (FSK) scheme based on channel quality and an interference component, and modulating information bits using a modulation scheme based on the QAM scheme and the FSK scheme which uses the parameter related to the QAM scheme and the parameter related to the FSK scheme.

35 Claims, 16 Drawing Sheets

(56) References Cited

U.S. PATENT DOCUMENTS

2012/0155415 A1    6/2012    Seok
2012/0213095 A1    8/2012    Krishnamurthy et al.

OTHER PUBLICATIONS

Asma Latif and Nasir D. Gohar, Performance of Hybrid MQAM-LFSK OFDM Transceiver in Rayleigh Fading Channels, Faculty of Electronic Engineering Sciences & Technology, Topi, Swabim NWFP Pakistan, Department of Information & System Engineeringm NUST Institute of Information Technology, Rawalpindi, Pakistan, Dec. 2006.

Asma Latif, Hybrid QAM-FSK (HQFM) OFDM Transceiver with Low PAPR, Ghulam Ishaq Khan Institute of Engineering Sciences and Technology, Jan. 2009.

* cited by examiner

METHOD AND APPARATUS FOR TRANSMITTING/RECEIVING SIGNAL IN COMMUNICATION SYSTEM

CROSS-REFERENCE TO RELATED APPLICATION(S)

This application claims the benefit under 35 U.S.C. §119(a) of a Korean patent application filed on Dec. 21, 2012 in the Korean Intellectual Property Office and assigned Serial number 10-2012-0150386, the entire disclosure of which is hereby incorporated by reference.

TECHNICAL FIELD

The present disclosure relates to a method and apparatus for transmitting/receiving a signal in a communication system.

BACKGROUND

To satisfy ever-increasing demands for wireless data traffic, communication systems have been developed to support higher data rates. For this purpose, a communication system seeks to improve spectral efficiency and increase channel capacity, for example, by various communication schemes such as an Orthogonal Frequency Division Multiplexing (OFDM) scheme, a Multiple Input Multiple Output (MIMO) scheme, and the like.

In a communication system, cell-edge User Equipments (UEs) having a low Signal-to-Noise Ratio (SNR) at a cell edge remote from a cell center or cell-edge users having a low Carrier-to-Interference and Noise Ratio (CINR) due to severe interference from a Base Station (BS) of a neighbor cell limit an overall system performance.

Accordingly, to increase the transmission efficiency of such cell-edge UEs, schemes such as an Inter-Cell Interference-Coordination (ICIC) scheme, a Coordinated Multi-Point (COMP) scheme, an interference cancellation scheme, and the like have been developed.

Although those schemes have been studied from the perspective of interference control at a transmitter or interference cancellation at a receiver, there is a need for a scheme that increases a channel capacity to an optimum level for a cell-edge UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting/receiving a signal using a modulation based on a Quadrature Amplitude Modulation (QAM) scheme and a Frequency Shift Keying (FSK) scheme in a communication system.

Another aspect of the present disclosure is to provide a method and apparatus for transmitting/receiving a signal using a modulation based on a QAM scheme and an FSK scheme and an M-ary coding scheme in a communication system.

Another aspect of the present disclosure is to provide a method and apparatus for transmitting/receiving a signal by considering an interference component and using a modulation based on a QAM scheme and an FSK scheme in a communication system.

Another aspect of the present disclosure is to provide a method and apparatus for transmitting/receiving a signal by considering channel information and using a modulation based on a QAM scheme and an FSK scheme in a communication system.

Another aspect of the present disclosure is to provide a method and apparatus for transmitting/receiving a signal using a modulation based on a QAM scheme and an FSK scheme in a communication system, thereby increasing channel capacity.

Another aspect of the present disclosure is to provide a method and apparatus for transmitting/receiving a signal using a modulation based on a QAM scheme and an FSK scheme in a communication system, thereby increasing a data transmission rate.

In accordance with an aspect of the present disclosure, a method for transmitting a signal by a signal transmission apparatus in a communication system is provided, The method includes detecting a parameter related to a QAM scheme and a parameter related to a FSK scheme based on channel quality and an interference component, and modulating information bits using a modulation scheme based on the QAM scheme and the FSK scheme which uses the parameter related to the QAM scheme and the parameter related to the FSK scheme.

In accordance with another aspect of the present disclosure, a method for receiving a signal by a signal reception apparatus in a communication system is provided. The method includes receiving a signal which is modulated using a modulation scheme based on a QAM scheme and a FSK scheme using a parameter related to the QAM scheme and a parameter related to the FSK scheme which are detected based on channel quality and an interference component from a signal transmission apparatus.

In accordance with another aspect of the present disclosure, a signal transmission apparatus in a communication system is provided. The signal transmission apparatus includes a controller configured to detect a parameter related to a QAM scheme and a parameter related to a FSK scheme based on channel quality and an interference component, and a transmitter configured to modulate information bits using a modulation scheme based on the QAM scheme and the FSK scheme which uses the parameter related to the QAM scheme and the parameter related to the FSK scheme.

In accordance with another aspect of the present disclosure, a signal reception apparatus in a communication system is provided. The signal reception apparatus includes a receiver configured to receive a signal which is modulated using a modulation scheme based on a QAM scheme and a FSK scheme using a parameter related to the QAM scheme and a parameter related to the FSK scheme which are detected based on channel quality and an interference component from a signal transmission apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
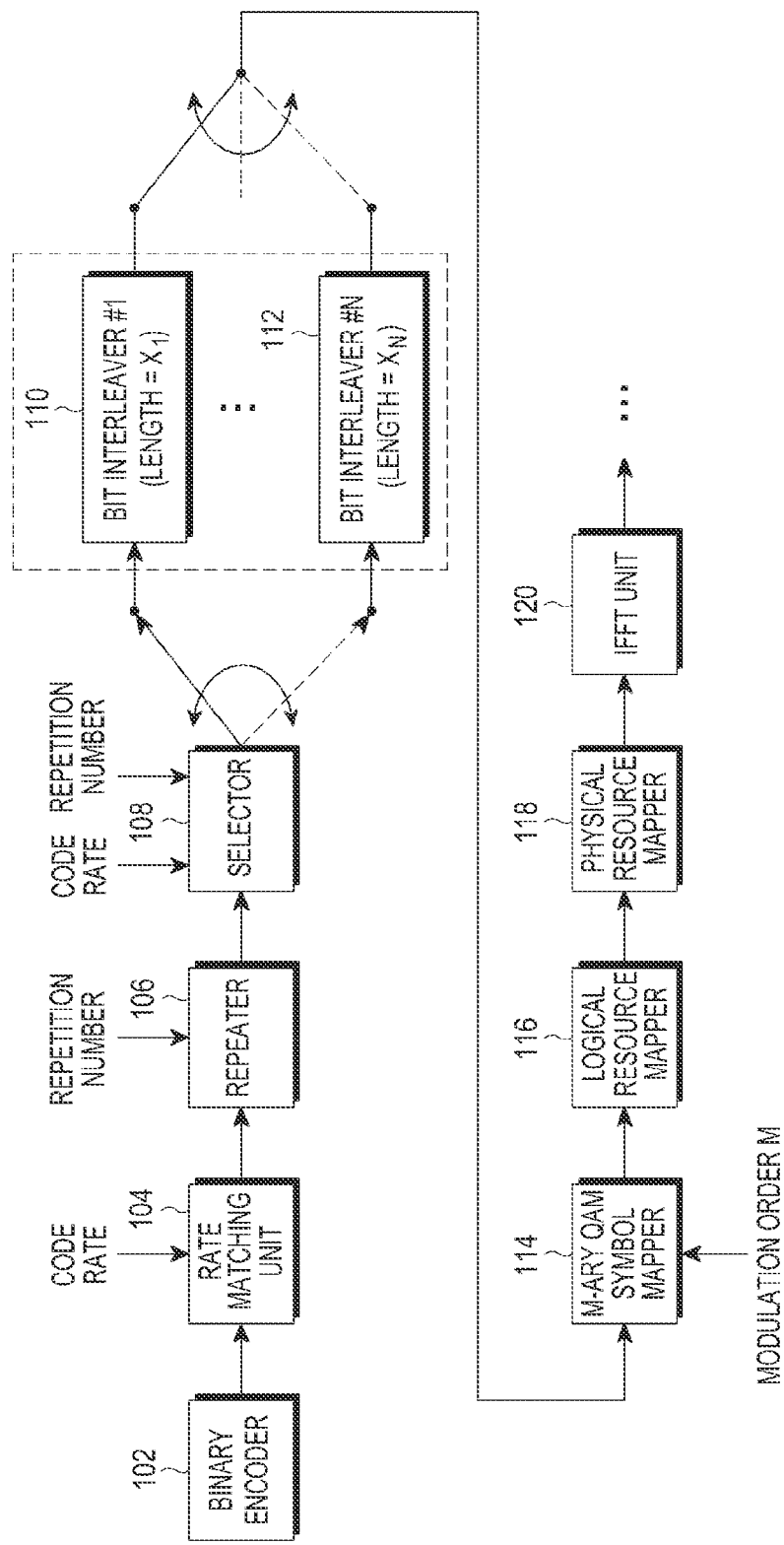
FIG. 1 schematically illustrates a block diagram of an internal structure of a signal transmission apparatus supporting a Bit Interleaved Coded Modulation (BICM) scheme and a Quadrature Amplitude Modulation (QAM) scheme in a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a User Equipment (UE) may be an electronic device.

Various embodiments of the present disclosure propose a method and apparatus for transmitting/receiving a signal using a modulation based on a Quadrature Amplitude Modulation (QAM) scheme and a Frequency Shift Keying (FSK) scheme in a communication system.

Various embodiments of the present disclosure propose a method and apparatus for transmitting/receiving a signal using a modulation based on a QAM scheme and an FSK scheme and an M-ary coding scheme in a communication system.

Various embodiments of the present disclosure propose a method and apparatus for transmitting/receiving a signal by considering an interference component and using a modulation based on a QAM scheme and an FSK scheme in a communication system.

Various embodiments of the present disclosure propose a method and apparatus for transmitting/receiving a signal by considering channel information and using a modulation based on a QAM scheme and an FSK scheme in a communication system.

Various embodiments of the present disclosure propose a method and apparatus for transmitting/receiving a signal using a modulation based on a QAM scheme and an FSK scheme in a communication system, thereby increasing channel capacity.

Various embodiments of the present disclosure propose a method and apparatus for transmitting/receiving a signal using a modulation based on a QAM scheme and an FSK scheme in a communication system, thereby increasing a data transmission rate.

Various embodiments of the present disclosure propose a method and apparatus for sharing an interference that a signal reception apparatus experiences with at least one neighbor signal transmission apparatus and an upper entity in a communication system, thereby increasing a data transmission rate.

Various embodiments of the present disclosure propose a method and apparatus for sharing an interference that a signal reception apparatus experiences with at least one neighbor signal transmission apparatus and an upper entity in a communication system, thereby adaptively reflecting the interference that the signal reception apparatus experiences and optimizing a signal transmission.

For convenience, a modulation based on a QAM scheme and an FSK scheme will be referred to as a 'Hybrid FSK and QAM Modulation (FQAM) scheme'. According to various embodiments of the present disclosure, the FQAM scheme is a modulation scheme in which the QAM scheme and the FSK scheme are combined. However, it will be understood by those of ordinary skill in the art that the FQAM scheme may be one of all modulation schemes that an input signal may be modulated in the same manner as described in various embodiments of the present disclosure as well as the modulation scheme in which the QAM scheme and the FSK scheme are combined.

A method and apparatus for transmitting/receiving a signal using an FQAM scheme proposed in various embodiments of the present disclosure may be applied to various communication systems such as a Long Term Evolution (LTE) mobile communication system, a Long Term Evolution-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2), a Wideband Code Division Multiple Access (WCDMA) mobile communication system proposed in a 3GPP2, a Code Division Multiple Access (CDMA) mobile communication system proposed in a 3GPP2, an Institute of Electrical and Electronics Engineers (IEEE) mobile communication system, an Evolved Packet System (EPS), a Mobile Internet Protocol (Mobile IP) system, and/or the like.

An Orthogonal Frequency Division Multiplexing (OFDM) scheme is used with a symbol modulation scheme such as a QAM scheme in order to improve spectral efficiency. By using with the OFDM scheme and the QAM scheme, a signal transmission apparatus may select an available modulation order according to a channel state using a symbol modulation scheme with various modulation orders. As a result, an operation of a communication system in which a performance required in the communication system is satisfied and a data transmission rate is increased is made possible.

In the communication system, various channel coding schemes have been used with the symbol modulation scheme in order to correct an error due to change of a channel. Even though the various channel coding schemes have been used in the communication system, a QAM scheme is generally used with a Bit Interleaved Coded Modulation (BICM) scheme. Accordingly, the communication system has been developed in view of optimizing a performance of the communication system by considering a complexity.

An internal structure of a signal transmission apparatus supporting a BICM scheme and a QAM scheme in a communication system according to an embodiment of the present disclosure will be described with reference to FIG. 1.

FIG. 1 schematically illustrates a block diagram of an internal structure of a signal transmission apparatus supporting a BICM scheme and a QAM scheme in a communication system according to an embodiment of the present disclosure.

Referring to FIG. 1, the signal transmission apparatus includes a binary encoder 102, a rate matching unit 104, a repeater 106, a selector 108, a plurality of bit interleavers (e.g., N bit interleavers such as, for example, a bit interleaver #1 110 to a bit interleaver #N 112), an M-ary QAM symbol mapper 114, a logical resource mapper 116, a physical resource mapper 118, and an Inverse Fast Fourier Transform (IFFT) unit 120.

Although the binary encoder 102, the rate matching unit 104, the repeater 106, the selector 108, the bit interleaver #1 110 to the bit interleaver #N 112, the M-ary QAM symbol mapper 114, the logical resource mapper 116, the physical resource mapper 118, and the IFFT unit 120 are shown in FIG. 1 as separate units, it is to be understood that such a configuration is for merely convenience of description. In other words, two or more of the binary encoder 102, the rate matching unit 104, the repeater 106, the selector 108, the bit interleaver #1 110 to the bit interleaver #N 112, the M-ary QAM symbol mapper 114, the logical resource mapper 116, the physical resource mapper 118, and the IFFT unit 120 may be incorporated into a single unit. Further, locations of the binary encoder 102, the rate matching unit 104, the repeater 106, the selector 108, the bit interleaver #1 110 to the bit interleaver #N 112, the M-ary QAM symbol mapper 114, the logical resource mapper 116, the physical resource mapper 118, and the IFFT unit 120 may be changed, and specific units among these units may be omitted.

Information bits inputted to the signal transmission apparatus are inputted to the binary encoder 102. The binary encoder 102 generates an encoded bit stream by encoding the information bits using a preset binary coding scheme, and outputs the encoded bit stream to the rate matching unit 104. The rate matching unit 104 generates a bit stream with a preset code rate by performing a rate matching operation on the encoded bit stream outputted from the binary encoder 102 using a preset rate matching scheme, and outputs the bit stream to the repeater 106. The repeater 106 generates a bit stream by repeating the bit stream outputted from the rate matching unit 104 according to a preset repetition number, and outputs the bit stream to the selector 108.

The selector 108 outputs the bit stream outputted from the repeater 106 to one of the bit interleaver #1 110 to the bit interleaver #N 112 by considering a code rate of the bit stream outputted from the repeater 106 and the repetition number. Each of the bit interleaver #1 110 to the bit interleaver #N 112 generates an interleaved bit stream by interleaving an inputted bit stream according to a preset interleaving pattern, and outputs the interleaved bit stream to the M-ary QAM symbol mapper 114. For example, each of the bit interleaver #1 110 to the bit interleaver #N 112 generates the interleaved bit stream by interleaving the inputted bit stream on a bit basis according to a preset length corresponding to the interleaving pattern, and outputs the interleaved bit stream to the M-ary QAM symbol mapper 114. For example, a length used in the bit interleaver #1 110 is $X_1$, and a length used in the bit interleaver #N 112 is $X_N$. The bit interleaver #1 110 to the bit interleaver #N 112 are designed corresponding to a channel coding scheme and a code rate.

The M-ary QAM symbol mapper 114 generates a QAM symbol stream in which m bits are mapped to one complex symbol by performing a symbol mapping operation corresponding to a preset modulation order M on the interleaved bit stream, and outputs the QAM symbol stream to the logical resource mapper 116. For example, according to m=$\log_2$ (M), 2 bits are mapped to a 4-QAM (Quadrature Phase Shift Keying (QPSK)) symbol, 4 bits are mapped to a 16-QAM symbol, and 6 bits are mapped to a 64-QAM symbol.

In other example, at least one of the three types of symbols may be omitted or other symbol may be alternatively or additionally used. The modulation order may be determined according to a Modulation and Coding Scheme (MCS) level which is determined to satisfy a target Frame Error Rate (FER) according to estimation values such as a Signal to Noise Ratio (SNR), a Signal to Interference and Noise Ratio (SINR), and the like. A general QAM symbol-based MCS level determining scheme will be described with reference to Table 1.

TABLE 1

| SINR [dB] | code rate | modulation scheme | spectral efficiency |
|---|---|---|---|
| −11.7 | 1/34 | QPSK | 0.06 |
| −8.7 | 1/17 | QPSK | 0.12 |
| −5.7 | 1/9 | QPSK | 0.23 |
| −3.6 | 1/5 | QPSK | 0.38 |
| −2.0 | 1/4 | QPSK | 0.53 |
| −0.5 | 3/8 | QPSK | 0.76 |
| 0.8 | 1/2 | QPSK | 0.96 |
| 2.4 | 3/5 | QPSK | 1.23 |
| 4.5 | 2/5 | 16-QAM | 1.56 |
| 6.0 | 1/2 | 16-QAM | 1.92 |
| 8.1 | 3/5 | 16-QAM | 2.46 |
| 10.1 | 1/2 | 64-QAM | 2.75 |
| 11.4 | 1/2 | 64-QAM | 3.13 |
| 12.9 | 3/5 | 64-QAM | 3.69 |
| 14.4 | 2/3 | 64-QAM | 4.13 |
| 16.2 | 7/9 | 64-QAM | 4.69 |
| 17.0 | 5/6 | 64-QAM | 4.92 |
| 19.3 | 11/12 | 64-QAM | 5.50 |

Meanwhile, a signal reception apparatus estimates an SINR, selects an MCS level related to the estimated SINR, and transmits feedback information indicating the selected MCS level to the signal transmission apparatus. For example, upon selecting an MCS level according to the QAM symbol-based MCS level determining scheme in Table 1, the signal reception apparatus estimates an SINR, selects a code rate 2/3 and a 64-QAM scheme as an MCS level related to an SINR less than 15 [dB] if the estimated SINR is 15 [dB], and transmits feedback information indicating the selected MCS level to the signal transmission apparatus. Accordingly, the signal transmission apparatus receives the feedback information from the signal reception apparatus, thereby selecting an MCS level using the received feedback information. In this example, spectral efficiency is 4.14.

The logical resource mapper 116 generates a logical resource mapping QAM symbol stream by mapping the QAM symbol stream outputted from the M-ary QAM symbol mapper 114 to a logical resource to be used for transmission, and outputs the logical resource mapping QAM symbol stream to the physical resource mapper 118. The physical resource mapper 118 generates a physical resource mapping QAM symbol stream by mapping the logical resource mapping QAM symbol stream to a physical resource to be used for transmission, and outputs the physical resource mapping QAM symbol stream to the IFFT unit 120. The IFFT unit 120 generates a time domain symbol stream by performing an IFFT operation on the physical resource mapping QAM symbol stream, and outputs the time domain symbol stream.

The time domain symbol stream outputted from the IFFT unit 120 is transmitted to a signal reception apparatus after an additional processing. A detailed description of the additional processing will be omitted herein.

Meanwhile, the signal transmission apparatus in FIG. 1 needs information on a channel state in order to maximally use a channel capacity, and selects an appropriate suitable modulation order and code rate for the channel state. For example, the signal transmission apparatus may select various MCS levels by performing an Adaptive Modulation and Coding (AMC) operation.

For example, for a UE with a relatively good channel state, the signal transmission apparatus may select a 16 QAM scheme and a code rate 1/2 for signal transmission. In this case, m=4, and a code rate r=1/2 according to m=$\log_2$ (M), and a repetition operation is not performed.

For another example, if a signal transmission apparatus (e.g., a Base Station (BS)) transmits a Broadcasting channel (BCH) signal, information data or an information bit to be transmitted includes 40 bits (24 data bits and 16 Cyclic Redundancy Check (CRC) code bits). In this case, m=2, a code rate r=1/3, and a repetition number=16. For example, after receiving a BCH signal during a total of 16 times, that is, after receiving total 1920 bits, a signal reception apparatus may successively recover BCH information data 24 bits by performing a de-interleaving operation and a channel decoding operation and completing a CRC check.

Meanwhile, other symbol modulation scheme is an FSK scheme. The FSK scheme is a scheme in which information bits distinguishable in a frequency domain are mapped to one symbol, and an information bit to desire to transmit is transmitted through different frequency resources.

In the QAM scheme, complex modulation symbols are generated with a combination of an In phase (I-phase) and a Quadrature phase (Q-phase), and the complex modulation symbols to which different information is mapped according to locations of the complex modulation symbols are transmitted. In the QAM scheme, there is no change of necessary time and frequency resource even though a modulation order is increased. However, because a length among modulation symbols becomes shortened, there is a need for relatively more transmission power in order that a signal reception apparatus receive a signal without an error. In a case in which a preset time and frequency resource is used, if a transmission power is infinite, information with an infinite size may be transmitted/received without an error, so the QAM scheme is classified as a modulation scheme which is efficient in view of a bandwidth (e.g., a bandwidth-efficient modulation scheme).

In contrast, in the FSK scheme, a size of information which may be transmitted through one symbol increases if a time and frequency resource increases for a preset transmission power, hence the FSK scheme is classified as a modulation scheme which is efficient in view of a transmission power (e.g., a power-efficient modulation scheme). In view of commercial efficiency, because relatively high efficiency is required in a transmission power rather than a frequency, the QAM scheme rather than the FSK scheme is preferred.

Figure 2:
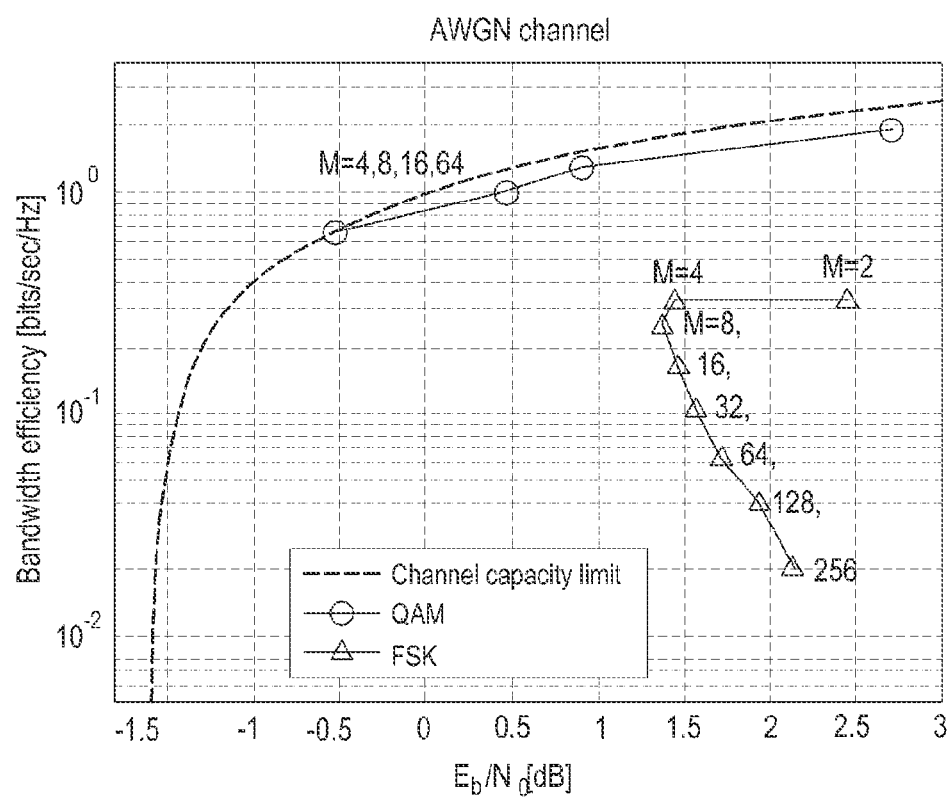
FIG. 2 is a graph illustrating a performance of each of QAM scheme and Frequency Shift Keying (FSK) scheme in an Additive White Gaussian Noise (AWGN) channel environment if a BICM scheme is used in a communication system according to an embodiment of the present disclosure.

FIG. 2 is a graph illustrating a performance of each of QAM scheme and FSK scheme in an Additive White Gaussian Noise (AWGN) channel environment if a BICM scheme is used in a communication system according to an embodiment of the present disclosure.

Referring to FIG. 2, a graph is generated under a situation based on an AWGN channel, a code rate r=1/3, and a BICM channel capability, and illustrates Shanon's channel capability limit, and a performance of each of a QAM scheme and an FSK scheme. As illustrated in the graph of FIG. 2, a horizontal axis denotes a ratio of noise power density to bit energy $E_b/N_0$ [dB], and a vertical axis denotes bandwidth efficiency [bits/sec/Hz].

Referring to FIG. 2, a performance graph for the QAM scheme denotes a performance in a case that a modulation order M=4, 8, 16, 64 is used in the QAM scheme. As illustrated in the performance graph for the QAM scheme, it will be understood that more $E_b/N_0$ is required as the modulation order is increased on the same code rate. On the contrary to this, if the $E_b/N_0$ is decreased, decreasing the modulation order as a modulation order less than a modulation order M=4 is generally not possible. Accordingly, a channel capacity may be acquired by decreasing a code rate instead of the modulation order.

However, decreasing a code rate is limited due to a complexity. For a code rate less than a preset first code rate, a repetitive transmission of a codeword is preferred. For example, a code rate r=1/3, and a repetition number 16 are used for a BCH in an LTE mobile communication system, and a code rate r=1/3, and a repetition number 8 are used for a BCH in an IEEE 802.16m mobile communication system.

In the QAM scheme, a codeword based on a code rate r=1/3 is used with a repetitive transmission for decreasing a code rate. In this case, a bandwidth-efficient characteristic of the QAM scheme is disappeared.

Figure 3:
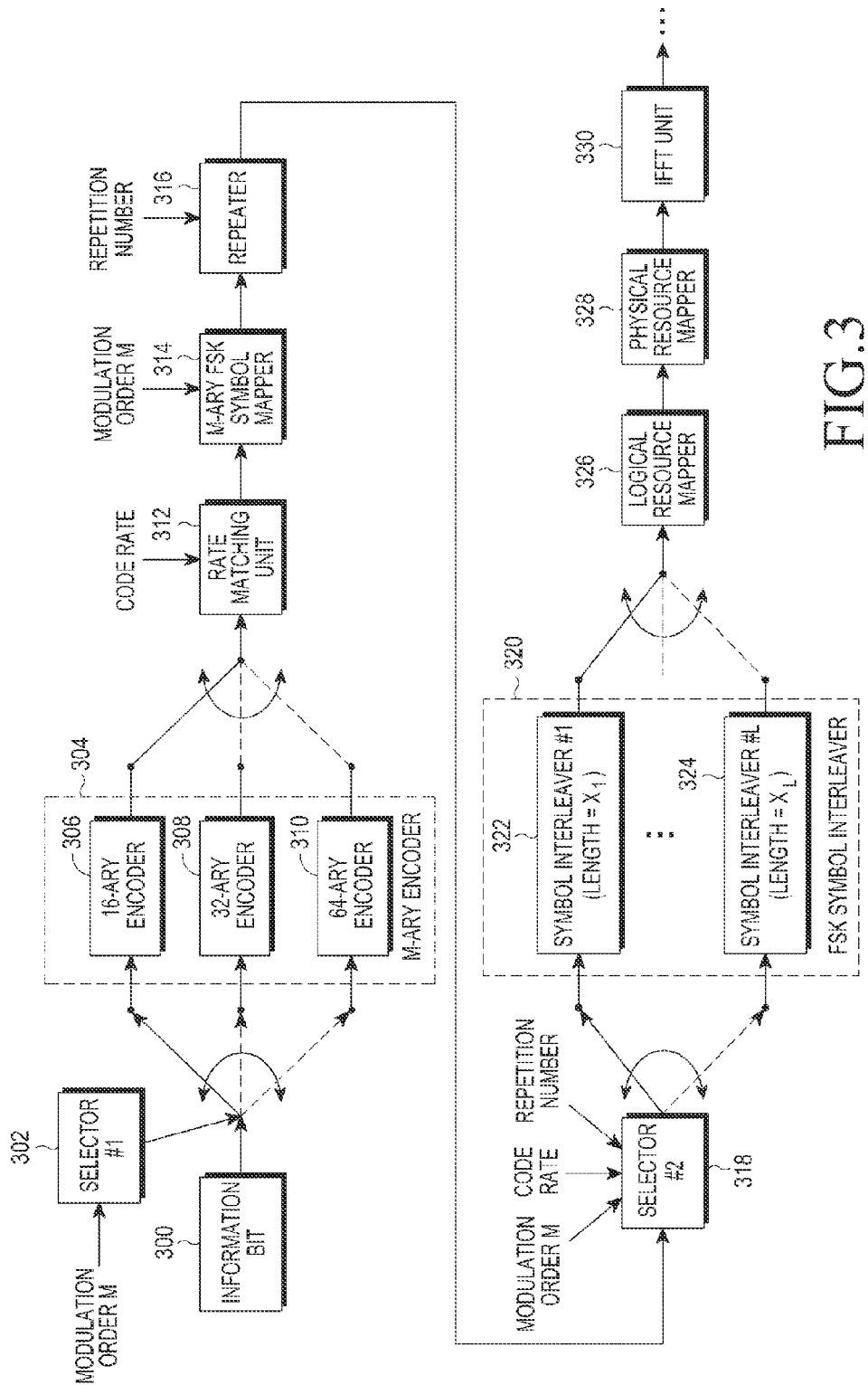
FIG. 3 schematically illustrates a block diagram of an internal structure of a signal transmission apparatus supporting an FSK scheme and an M-ary Coding and Modulation (CM) scheme in a communication system according to an embodiment of the present disclosure.

FIG. 3 schematically illustrates a block diagram of an internal structure of a signal transmission apparatus supporting an FSK scheme and an M-ary Coding and Modulation (CM) scheme in a communication system according to an embodiment of the present disclosure.

Referring to FIG. 3, the signal transmission apparatus includes a selector #1 302, an M-ary encoder 304, a rate matching unit 312, an M-ary FSK symbol mapper 314, a repeater 316, a selector #2 318, an FSK symbol interleaver 320, a logical resource mapper 326, a physical resource mapper 328, and an IFFT unit 330. The M-ary encoder 304 includes a 16-ary encoder 306, a 32-ary encoder 308, and a 64-ary encoder 310. The FSK symbol interleaver 320 includes a plurality of symbol interleavers (e.g., L symbol interleavers such as, for example, a symbol interleaver #1 322 to a symbol interleaver #L 324).

Although the selector #1 302, the M-ary encoder 304, the rate matching unit 312, the M-ary FSK symbol mapper 314, the repeater 316, the selector #2 318, the FSK symbol interleaver 320, the logical resource mapper 326, the physical resource mapper 328, and the IFFT unit 330 are shown in FIG. 3 as separate units, it is to be understood that such a configuration is for merely convenience of description. In other words, two or more of the selector #1 302, the M-ary encoder 304, the rate matching unit 312, the M-ary FSK symbol mapper 314, the repeater 316, the selector #2 318, the FSK symbol interleaver 320, the logical resource mapper 326, the physical resource mapper 328, and the IFFT unit 330 may be incorporated into a single unit. Further, locations of the selector #1 302, the M-ary encoder 304, the rate matching unit 312, the M-ary FSK symbol mapper 314, the repeater 316, the selector #2 318, the FSK symbol interleaver 320, the logical resource mapper 326, the physical resource mapper 328, and the IFFT unit 330 may be changed, and specific units among these units may be omitted.

Firstly, information bits 300 is inputted to the selector #1 302, and the selector #1 302 outputs m information bits among the information bits 300 to the M-ary encoder 304 according to a preset modulation order M. 4 information bits are inputted to the 16-ary encoder 306, 5 information bits are inputted to the 32-ary encoder 308, and 6 information bits are inputted to the 64-ary encoder 310 according to m=$\log_2$ (M). The 16-ary encoder 306 generates an encoded bit stream by encoding the inputted bits using a 16-ary coding scheme, and outputs the encoded bit stream to the rate matching unit 312. The 32-ary encoder 308 generates an encoded bit stream by encoding the inputted bits using a 32-ary coding scheme, and outputs the encoded bit stream to the rate matching unit 312. The 64-ary encoder 310 generates an encoded bit stream by encoding the inputted bits using a 64-ary coding scheme, and outputs the encoded bit stream to the rate matching unit 312.

The encoded bit stream outputted from the M-ary encoder 304 is inputted to the rate matching unit 312, and the rate matching unit 312 converts the encoded bit stream outputted from the M-ary encoder 304 to a bit stream with a desired code rate using a preset rate matching scheme, and outputs the bit stream with the desired code rate to the M-ary FSK symbol mapper 314. The M-ary FSK symbol mapper 314 generates an FSK symbol stream by mapping each inputted bit stream to one complex symbol by considering a modulation order M, and outputs the FSK symbol stream to the repeater 316. The repeater 316 generates a repeated symbol stream by repeating the FSK symbol stream outputted from the M-ary FSK symbol mapper 314 by a preset repetition number, and outputs the repeated symbol stream to the selector #2 318.

The selector #2 318 outputs the repeated symbol stream outputted from the repeater 316 to one of the symbol interleaver #1 322 to the symbol interleaver #L 324 by considering the modulation order, the code rate, and the repetition number. Each of the symbol interleaver #1 322 to the symbol interleaver #L 324 generates an interleaved symbol stream by interleaving the symbol stream outputted from the selector #2 318 according to a preset interleaving pattern, and outputs the interleaved symbol stream to the logical resource mapper 326. For example, each of the symbol interleaver #1 322 to the symbol interleaver #L 324 interleaves the symbol stream outputted from the selector #2 318 on a symbol basis according to a preset length ($X_1$ to $X_L$), and outputs the interleaved symbol stream to the logical resource mapper 326. The $X_1$ denotes a length which the symbol interleaver #1 322 uses, and the $X_L$ denotes a length which the symbol interleaver #L 324 uses.

The logical resource mapper 326 inputs the interleaved symbol stream outputted from the FSK symbol interleaver 320, generates a logical resource mapping symbol stream by mapping the interleaved symbol stream to a logical resource to be used for transmission, and outputs the logical resource mapping symbol stream to the physical resource mapper 328. The physical resource mapper 328 generates a physical resource mapping symbol stream by mapping the logical resource mapping symbol stream to a physical resource to be used for transmission, and outputs the physical resource mapping symbol stream to the IFFT unit 330. The IFFT unit 330 generates a time domain symbol stream by performing an IFFT operation on the physical resource mapping symbol stream outputted from the physical resource mapper 328, and outputs the time domain symbol stream. The time domain symbol stream outputted from the IFFT unit 330 is transmitted to a signal reception apparatus through an additional processing. A detailed description of the additional processing will be omitted herein.

Figure 4:
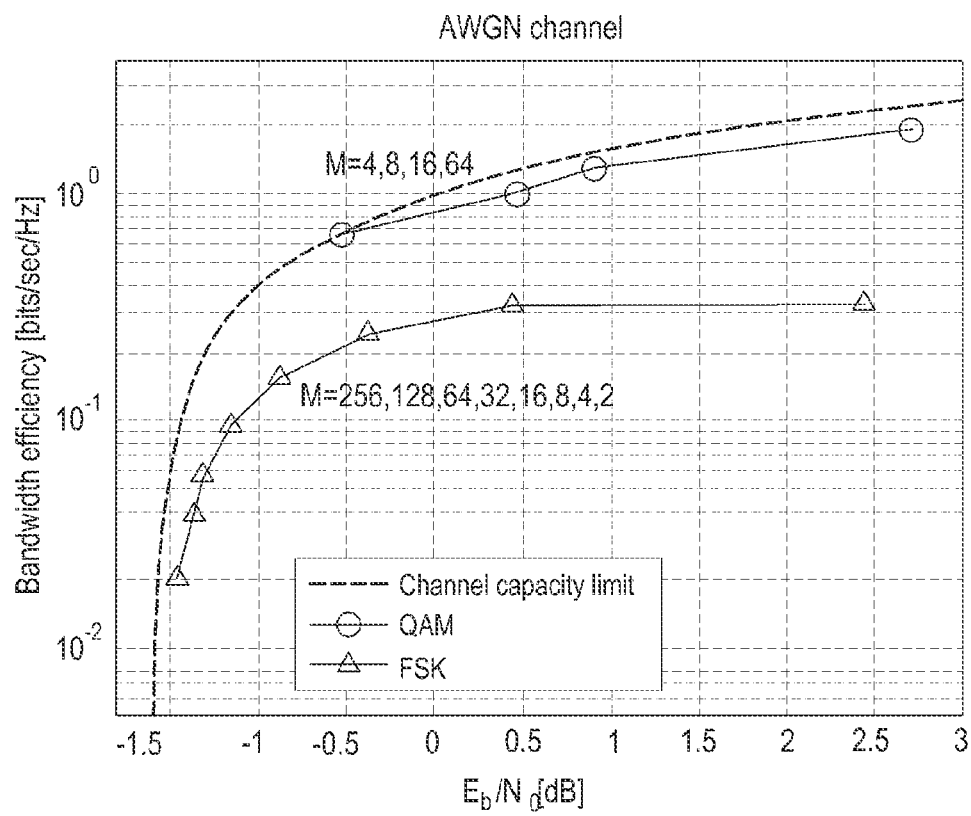
FIG. 4 is a graph illustrating a performance of each of QAM scheme and FSK scheme if an M-ary CM scheme is used in a communication system according to an embodiment of the present disclosure.

FIG. 4 is a graph illustrating a performance of each of QAM scheme and FSK scheme if an M-ary CM scheme is used in a communication system according to an embodiment of the present disclosure.

Referring to FIG. 4, a graph is generated under a situation based on an AWGN channel, a code rate r=1/3, and a CM channel capability, and illustrates Shanon's channel capability limit, and a performance of each of a QAM scheme and an FSK scheme. As illustrated in the graph of FIG. 4, a horizontal axis denotes a ratio of noise power density to bit energy $E_b/N_0$ [dB], and a vertical axis denotes bandwidth efficiency [bits/sec/Hz].

Referring to FIG. 4, a performance graph of the FSK scheme illustrates a performance in a case that a modulation order M=256, 128, 64, 32, 16, 8, 4, 2 is used in the FSK scheme, and it will be understood that a performance of the FSK scheme in a case that an M-ary CM scheme is used remarkably becomes enhanced compared to a performance of the FSK scheme in a case that a BICM scheme (e.g., such as the example illustrated in the graph of FIG. 2) is used.

As described above, the FSK scheme is efficient in view of power. However, the FSK scheme has relatively low bandwidth efficiency for various modulation orders unlike the QAM scheme.

Various embodiments of the present disclosure proposes an FQAM scheme based on a modulation scheme which is efficient in view of a bandwidth (e.g., a QAM scheme) and a modulation scheme which is efficient in view of power (e.g., an FSK scheme), and a detailed description will be followed.

According to various embodiments of the present disclosure, the FQAM scheme is a modulation scheme in which the QAM scheme and the FSK scheme are combined. However, it will be understood by those of ordinary skill in the art that the FQAM scheme may be one of all modulation schemes that an input signal may be modulated in the same manner as described according to various embodiments of the present disclosure as well as the modulation scheme in which the QAM scheme and the FSK scheme are combined.

A basic concept of an FQAM scheme according to various embodiments of the present disclosure will be described with reference to FIG. 5.

Figure 5:
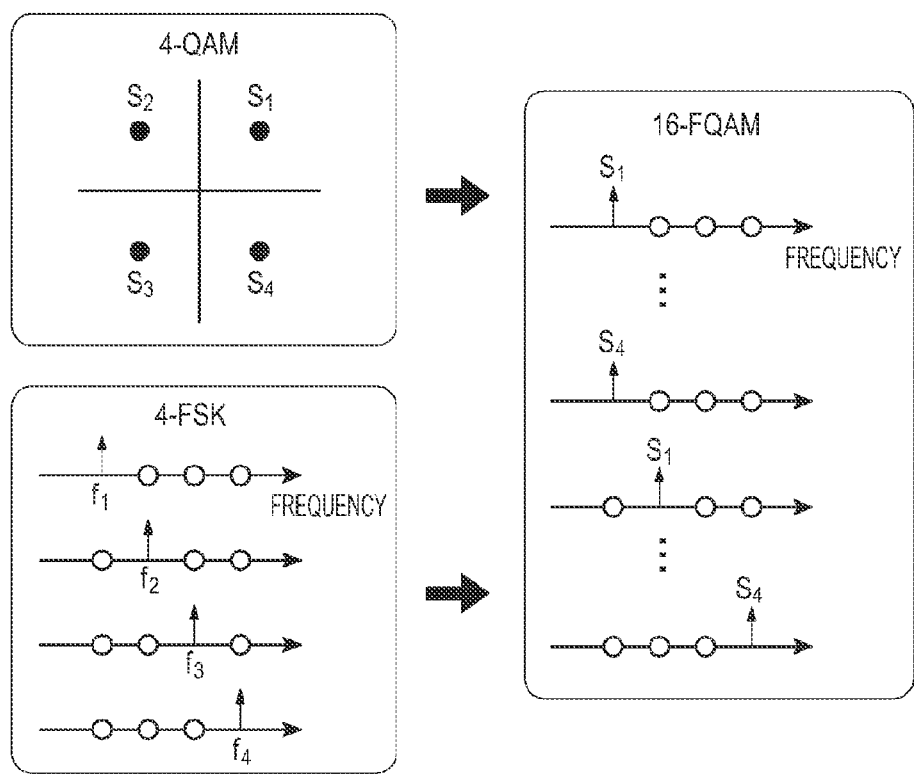
FIG. 5 schematically illustrates a basic concept of a Hybrid FSK and QAM Modulation (FQAM) scheme according to an embodiment of the present disclosure.

FIG. 5 schematically illustrates a basic concept of an FQAM scheme according to an embodiment of the present disclosure.

Referring to FIG. 5, an FQAM scheme includes a characteristic of a QAM scheme and an FSK scheme. Hereinafter, for example, a 16-FQAM scheme based on a tetrad QAM scheme (e.g., a 4-QAM (QPSK) scheme and a 4-FSK scheme) which uses 4 modulation frequencies will be described.

Referring to FIG. 5, a constellation of a 4-QAM scheme includes 4 signal points $S_1$, $S_2$, $S_3$, and $S_4$ to which a modulated digital signal may be mapped. The 4 signal points have the same magnitude, and include complex modulation symbols (a, a), (−a, a), (−a, −a), (a, −a) which have a phase difference of 90 degrees between two adjacent signal points. For example, one of information bits 00, 01, 10, and 11 may be mapped to each of the 4 signal points.

In the 4-FSK scheme, each of information bits is transmitted through one of 4 different modulation frequencies. For example, each of information bits 00, 01, 10, and 11 may be transmitted through one of modulation frequencies $f_1$, $f_2$, $f_3$, and $f_4$.

In a 16-FQAM scheme based on the 4-QAM scheme and the 4-FSK scheme, 4 signal points $S_1$, $S_2$, $S_3$, and $S_4$ are transmitted through one of 4 modulation frequencies $f_1$, $f_2$, $f_3$, and $f_4$. For example, $S_1$, $S_2$, $S_3$, and $S_4$ are transmitted through a modulation frequency $f_1$, $S_1$, $S_2$, $S_3$, and $S_4$ are transmitted through a modulation frequency $f_2$, $S_1$, $S_2$, $S_3$, and $S_4$ are transmitted through a modulation frequency $f_3$, and $S_1$, $S_2$, $S_3$, and $S_4$ are transmitted through a modulation frequency $f_4$. Accordingly in the 16-FQAM scheme, 16 information units (e.g., 4 information bits) may be transmitted using a transmission resource with quantity equal to quantity of the 4-QAM scheme or the 4-FSK scheme.

The FQAM scheme is a modulation scheme in which information bits are mapped using a constellation and a frequency location. Referring to FIG. 5, a single-tone FQAM scheme is illustrated, however, it will be understood by those of ordinary skill in the art that a multi-tone FQAM scheme in which information bits are mapped using various patterns of various frequencies may be implemented.

According to various embodiments of the present disclosure, the FQAM scheme may include all of the single-tone FQAM scheme and the multi-tone FQAM scheme.

Figure 6:
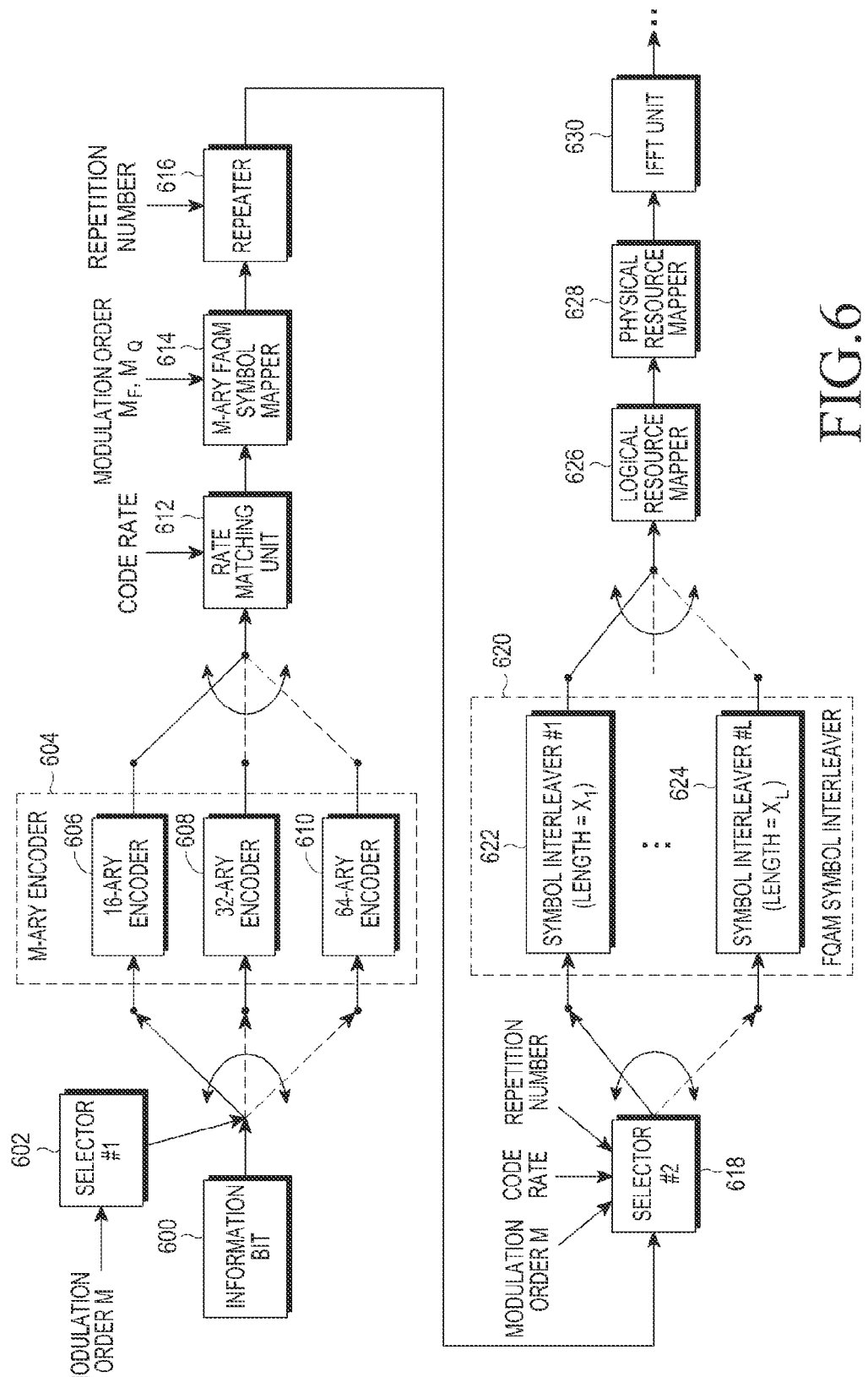
FIG. 6 schematically illustrates a block diagram of an internal structure of a signal transmission apparatus supporting an FQAM scheme and an M-ary CM scheme in a communication system according to an embodiment of the present disclosure.

FIG. 6 schematically illustrates a block diagram of an internal structure of a signal transmission apparatus supporting an FQAM scheme and an M-ary CM scheme in a communication system according to an embodiment of the present disclosure.

Referring to FIG. 6, the signal transmission apparatus includes a selector #1 602, an M-ary encoder 604, a rate matching unit 612, an M-ary FQAM symbol mapper 614, a repeater 616, a selector #2 618, an FQAM symbol interleaver 620, a logical resource mapper 626, a physical resource mapper 628, and an IFFT unit 630. The M-ary encoder 604 includes a 16-ary encoder 606, a 32-ary encoder 608, and a 64-ary encoder 610. The FQAM symbol interleaver 620 includes a plurality of symbol interleavers (e.g., L symbol interleavers, such as, for example, a symbol interleaver #1 622 to a symbol interleaver #L 624).

Although the selector #1 602, the M-ary encoder 604, the rate matching unit 612, the M-ary FQAM symbol mapper 614, the repeater 616, the selector #2 618, the FQAM symbol interleaver 620, the logical resource mapper 626, the physical resource mapper 628, and the IFFT unit 630 are shown in FIG. 6 as separate units, it is to be understood that such a configuration is for merely convenience of description. In other words, two or more of the selector #1 602, the M-ary encoder 604, the rate matching unit 612, the M-ary FQAM symbol mapper 614, the repeater 616, the selector #2 618, the FQAM symbol interleaver 620, the logical resource mapper 626, the physical resource mapper 628, and the IFFT unit 630 may be incorporated into a single unit. Further, locations of the selector #1 602, the M-ary encoder 604, the rate matching unit 612, the M-ary FQAM symbol mapper 614, the repeater 616, the selector #2 618, the FQAM symbol interleaver 620, the logical resource mapper 626, the physical resource mapper 628, and the IFFT unit 630 may be changed, and specific units among these units may be omitted.

Firstly, information bits 600 are inputted to the selector #1 602, and the selector #1 602 outputs m information bits among the information bits 600 to the M-ary encoder 604 according to a preset modulation order M. The modulation order M denotes a modulation order of an FQAM scheme. 4 information bits are inputted to the 16-ary encoder 606, 5 information bits are inputted to the 32-ary encoder 608, and 6 information bits are inputted to the 64-ary encoder 610 according to m=$\log_2$(M). The modulation order M is determined based on Channel Quality Information (CQI) which is fed back from a signal reception apparatus, modulation orders $M_F$ and $M_Q$ which are determined according to a request of a neighbor BS (signal transmission apparatus) or an upper entity. For example, the modulation order M is determined as M=$M_F$*$M_Q$. The modulation order $M_F$ denotes a parameter related to an FSK scheme (e.g., a modulation order of the FSK scheme), and the modulation order $M_Q$ denotes a parameter related to a QAM scheme (e.g., a modulation order of the QAM scheme). The modulation orders $M_F$ and $M_Q$ will be described with reference to FIG. 7, so a detailed description will be omitted herein.

The 16-ary encoder 606 generates an encoded bit stream by encoding the inputted bits using a 16-ary coding scheme, and outputs the encoded bit stream to the rate matching unit 612. The 32-ary encoder 608 generates an encoded bit stream by encoding the inputted bits using a 32-ary coding scheme, and outputs the encoded bit stream to the rate matching unit 612. The 64-ary encoder 610 generates an encoded bit stream by encoding the inputted bits using a 64-ary coding scheme, and outputs the encoded bit stream to the rate matching unit 612.

The encoded bit stream outputted from the M-ary encoder 604 is inputted to the rate matching unit 612, and the rate matching unit 612 converts the encoded bit stream outputted from the M-ary encoder 604 to a bit stream with a desired code rate using a preset rate matching scheme, and outputs the converted bit stream to the M-ary FQAM symbol mapper 614. The M-ary FQAM symbol mapper 614 generates an FQAM symbol stream by mapping each inputted bit stream to one complex symbol by considering the modulation order $M_F$ and $M_Q$, and outputs the FQAM symbol stream to the repeater 616. The repeater 616 generates a repeated symbol stream by repeating the FQAM symbol stream by a preset repetition number, and outputs the repeated symbol stream to the selector #2 618.

The selector #2 618 outputs the repeated symbol stream to one of the symbol interleaver #1 622 to the symbol interleaver #L 624 by considering the modulation order M, the code rate, and the repetition number. Each of the symbol interleaver #1 622 to the symbol interleaver #L 624 generates an interleaved symbol stream by interleaving the symbol stream outputted from the selector #2 618 according to a preset interleaving pattern, and outputs the interleaved symbol stream to the logical resource mapper 626. For example, each of the symbol interleaver #1 622 to the symbol interleaver #L 624 interleaves the symbol stream outputted from the selector #2 618 on a symbol basis according to a preset length ($X_1$ to $X_L$), and outputs the interleaved symbol stream to the logical resource mapper 626. The $X_1$ denotes a length which the symbol interleaver #1 622 uses, and the $X_L$ denotes a length which the symbol interleaver #L 624 uses. The logical resource mapper 626 inputs the interleaved symbol stream outputted from the FSK symbol interleaver 620, generates a logical resource mapping symbol stream by mapping the interleaved symbol stream to a logical resource to be used for transmission, and outputs the logical resource mapping symbol stream to the physical resource mapper 628. The physical resource mapper 628 generates a physical resource mapping symbol stream by mapping the logical resource mapping symbol stream to a physical resource to be used for transmission, and outputs the physical resource mapping symbol stream to the IFFT unit 630. The IFFT unit 630 generates a time domain symbol stream by performing an IFFT operation on the physical resource mapping symbol stream outputted from the physical resource mapper 628, and outputs the time domain symbol stream. The time domain symbol stream outputted from the IFFT unit 630 is transmitted to a signal reception apparatus through an additional processing. A detailed description of the additional processing will be omitted herein.

Meanwhile, the signal transmission apparatus in FIG. 6 may include a controller which determines modulation orders M, $M_F$, and $M_Q$, a code rate, and a repetition number in order to determine a proper transmission scheme. An operation of determining modulation orders M, $M_F$, and $M_Q$, a code rate, and a repetition number in a controller included in a signal transmission apparatus will be described with reference to FIG. 7.

Figure 7:
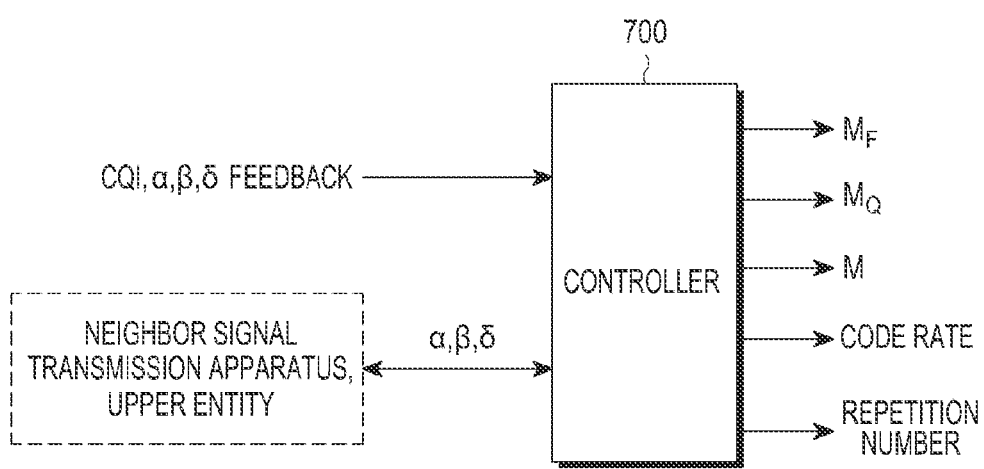
FIG. 7 schematically illustrates an operation of a controller included in a signal transmission apparatus supporting an FQAM scheme and an M-ary CM scheme in a communication system according to an embodiment of the present disclosure.

FIG. 7 schematically illustrates an operation of a controller included in a signal transmission apparatus supporting an FQAM scheme and an M-ary CM scheme in a communication system according to an embodiment of the present disclosure.

According to various embodiments of the present disclosure, a controller 700 may be separately located from units included in a signal transmission apparatus in FIG. 6, and located between specific units among the units.

Referring to FIG. 7, a CQI and parameters α, β, and δ indicating an interference component which are fed back from a signal reception apparatus are provided to the controller 700. As illustrated in FIG. 7, the signal transmission apparatus receives the parameters α, β, and δ from the signal reception apparatus, however, it will be understood by those of ordinary skill in the art that the signal transmission apparatus may receive at least one of the parameters α, β, and δ.

Further, an operation of receiving the CQI and the parameters α, β, and δ in the controller 700 may include an operation in which the signal transmission apparatus transmits a message which requests the signal reception apparatus to transmit the CQI and the parameters α, β, and δ to the signal reception apparatus, and an operation in which the signal transmission apparatus receives a message including the CQI and the parameters α, β, and δ.

The parameters α and β denote statistics parameters which are modeled under an assumption that an interference component on an interference channel has a Complex Generalized Gaussian (CGG) distribution, and may be expressed as provided by Equation (1).

$$\begin{cases} \alpha = \dfrac{\ln(3^6/2^{10})}{\ln\left((E[|J_l[k]|])^2/E[|J_l[k]|^2] - \dfrac{\pi}{4} + \dfrac{9}{2^{3.5}}\right) + \ln\left(\dfrac{3}{2\sqrt{2}}\right)} \\ \beta = \dfrac{\Gamma(2/\alpha)}{\Gamma(3/\alpha)} E[|J_l[k]|] \end{cases} \quad \text{Equation (1)}$$

In Equation (1), k denotes an FQAM symbol index, an FQAM symbol is generated on $M_F$ frequency tones basis, and l denotes a frequency tone index, where l=1, . . . , $M_F$.

In Equation (1), $$\Gamma(x) = \int_0^\infty t^{x-1} \exp(-t) dt$$

denotes a gamma function, denotes $J_l[k]=Y_l[k]-H_{1,l}[k]s[k]$ $\eta_{m[k],l}$, and denotes values except for a desired signal from the kth FQAM received signal, and expressed for $M_F$ (l=1 to $M_F$) frequency tones on the kth FQAM received signal. There is a desired signal for an m[k] frequency tone where an FQAM signal is carried among the $M_F$ frequency tones. For the m[k] frequency tone, a value which is generated by subtracting the desired signal from the kth FQAM received signal is equal to a sum of an interference signal and a noise, and the kth FQAM received signal is equal to the sum of the interference signal and the noise for the remaining frequency tones. In Equation (1), $H_{1,l}[k]$ denotes channel information related to a desired signal on the lth frequency tone for the kth FQAM symbol, and s[k] denotes a QAM signal for the kth transmission data symbol. In Equation (1), $\eta_{m[k],l}$ denotes a delta function, has a value '1' if m[k] is l, and has a value '0' if m[k] is not l. m[k] denotes a frequency tone index where an FQAM signal is carried.

The parameter α may be derived from secondary statistics of a value except for a signal component which a signal reception apparatus desires to receive from a received signal, and the parameter β may be derived from a primary statistics of a value except for a signal component which targets the signal reception apparatus from the received signal. The parameter δ is an index indicating a difference between a histogram illustrating an interference statistics model which the signal reception apparatus calculates (e.g., Inter-Carrier Interference (ICI)) and a CGG distribution modeled based on the parameters α and β. For example, if the difference between the interference statistics model and the CGG distribution is less than or equal to a preset difference value, the parameter δ is determined as '0', and if the difference between the interference statistics model and the CGG distribution is greater than the preset difference value, the parameter δ is determined as '1'.

The signal transmission apparatus shares parameters α, β, and δ indicating an interference component which are fed back from the signal reception apparatus with a neighbor signal transmission apparatus or an upper entity, and predicts an interference that the signal reception apparatus experiences within a communication area of the signal transmission apparatus. If the predicted interference experienced is a normal distribution, the controller 700 controls the signal transmission apparatus to request at least one neighbor signal transmission apparatus to increase the modulation order $M_F$, thereby decreasing a normal distribution characteristic of interference for the signal reception apparatus within a related communication area. If the predicted interference experienced is not the normal distribution, the controller 700 controls the signal transmission apparatus to transmit information indicating that the at least one neighbor transmission apparatus may increase the modulation order $M_Q$ in order to improve transmission efficiency, so the at least one neighbor transmission apparatus may recognize this situation.

An example of Hull Curve per parameter α of a QAM scheme and an FQAM scheme of which a modulation order $M_F$ is 4 (SINR to spectral efficiency) in a communication system according to an embodiment of the present disclosure will be described with reference to FIG. 15.

Figure 15:
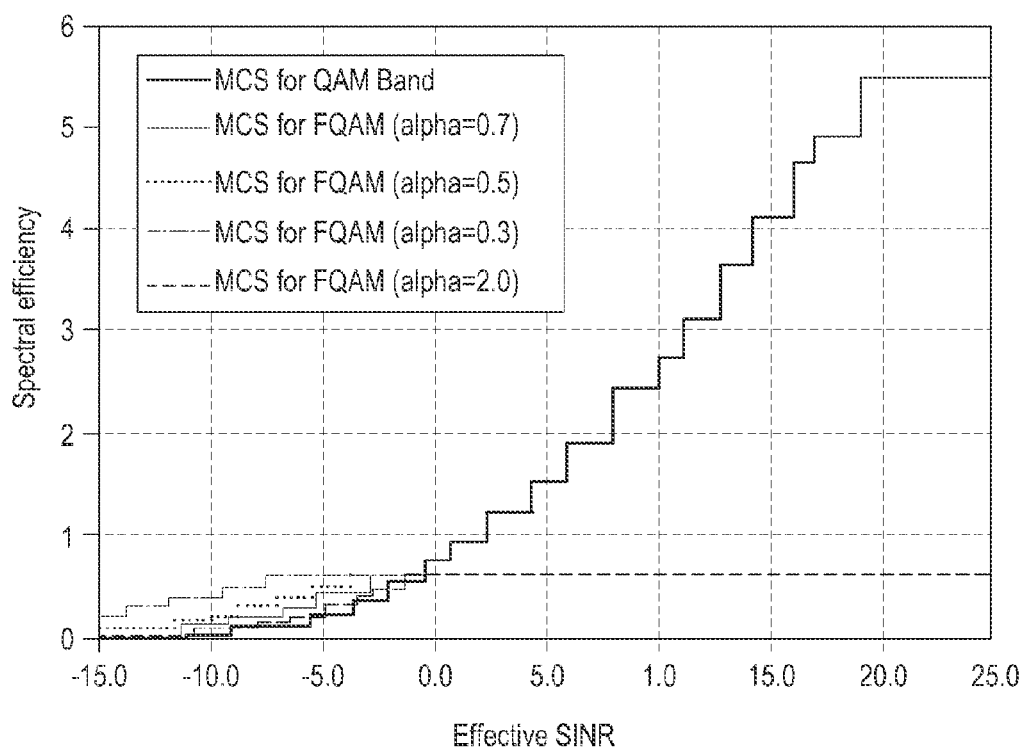
FIG. 15 is a graph illustrating an example of Hull Curve per parameter $\alpha$ of a QAM scheme and an FQAM scheme of which a modulation order $M_F$ is 4 (Signal to Interference and Noise Ratio (SINR) to spectral efficiency) in a communication system according to an embodiment of the present disclosure.

FIG. 15 is a graph illustrating an example of Hull Curve per parameter α of a QAM scheme and an FQAM scheme of which a modulation order $M_F$ is 4 (SINR to spectral efficiency) in a communication system according to an embodiment of the present disclosure.

Referring to FIG. 15, a curve illustrated as "MCS for QAM Band" indicates spectral efficiency according to an effective SINR based on an MCS level (e.g., Table 1) of a general QAM scheme. In FIG. 15, an effective SINR in an X-axis denotes an SINR used for decoding data after applying a reception algorithm to be used in a signal reception apparatus, and a scale is [dB].

As illustrated in FIG. 15, in an FQAM scheme, frequency efficiency may alter significantly according to a value of a parameter α even though SINRs are the same. For example, if an SINR is −5[dB] and a value of a parameter α is 2, frequency efficiency is approximately 0.2. In contrast, if an SINR is −5[dB] and a value of a parameter α is 0.3, frequency efficiency is approximately 0.62.

In Table 2 to Table 5, an example of an MCS level according to a value of a parameter α is expressed if an FQAM scheme with a modulation order $M_F$=4 is used.

TABLE 2

| SNR [dB] | SE | $M_F$, $M_Q$, code rate |
|---|---|---|
| −15.0 | 0.21 | 4F8QAM R = 1/6 |
| −13.8 | 0.33 | 4F4QAM R = 1/3 |
| −11.9 | 0.42 | 4F8QAM R = 1/3 |
| −9.5 | 0.50 | 4F4QAM R = 1/2 |
| −7.6 | 0.63 | 4F8QAM R = 1/2 |

Referring to Table 2, an MCS level is expressed if a value of a parameter α is 0.3.

TABLE 3

| SNR [dB] | SE | $M_F$, $M_Q$, code rate |
|---|---|---|
| −15.0 | 0.08 | 4F4QAM R = 1/12 |
| −13.1 | 0.10 | 4F8QAM R = 1/12 |
| −11.8 | 0.17 | 4F4QAM R = 1/6 |
| −10.1 | 0.21 | 4F8QAM R = 1/6 |
| −8.8 | 0.33 | 4F4QAM R = 1/3 |
| −7.1 | 0.42 | 4F8QAM R = 1/3 |
| −5.5 | 0.50 | 4F4QAM R = 1/2 |
| −3.8 | 0.63 | 4F8QAM R = 1/2 |

Referring to Table 3, an MCS level is expressed if a value of a parameter α is 0.5.

TABLE 4

| SNR [dB] | SE | $M_F$, $M_Q$, code rate |
|---|---|---|
| −15.0 | 0.04 | 4F4QAM R = 1/24 |
| −14.3 | 0.05 | 4F8QAM R = 1/24 |
| −12.8 | 0.08 | 4F4QAM R = 1/12 |
| −11.3 | 0.10 | 4F8QAM R = 1/12 |
| −9.8 | 0.17 | 4F4QAM R = 1/6 |
| −8.3 | 0.21 | 4F8QAM R = 1/6 |
| −6.8 | 0.33 | 4F4QAM R = 1/3 |
| −5.3 | 0.42 | 4F8QAM R = 1/3 |
| −4.0 | 0.50 | 4F4QAM R = 1/2 |
| −2.4 | 0.63 | 4F8QAM R = 1/2 |

Referring to Table 4, an MCS level is expressed if a value of a parameter α is 0.7.

TABLE 5

| SNR [dB] | SE | $M_F$, $M_Q$, code rate |
|---|---|---|
| −15.0 | 0.04 | 4F4QAM R = 1/24 |
| −12.6 | 0.05 | 4F8QAM R = 1/24 |
| −10.9 | 0.08 | 4F4QAM R = 1/12 |
| −9.6 | 0.10 | 4F8QAM R = 1/12 |
| −7.9 | 0.17 | 4F4QAM R = 1/6 |
| −6.6 | 0.21 | 4F8QAM R = 1/6 |
| −4.9 | 0.33 | 4F4QAM R = 1/3 |
| −3.6 | 0.42 | 4F8QAM R = 1/3 |
| −2.8 | 0.50 | 4F4QAM R = 1/2 |
| −1.4 | 0.63 | 4F8QAM R = 1/2 |

Referring to Table 5, an MCS level is expressed if a value of a parameter α is 2.

Meanwhile, a scheme for selecting an MCS level in a case that the FQAM scheme is used is different from a scheme for selecting an MCS level in a case that a QAM scheme is used, and a detailed description will be followed by considering each of a signal reception apparatus (e.g., a UE) and a signal transmission apparatus (e.g., a base station).

(1) A Case that a Signal Reception Apparatus (UE) is Considered

A signal reception apparatus uses a parameter α as well as CQI (e.g., SINR) in order to determine an MCS level for a signal transmission apparatus. Accordingly, a reception performance may be different according to a value of the parameter α even though SINRs are the same as described above.

If the signal transmission apparatus does not operate the FQAM scheme and the QAM scheme separately by classifying a resource into a frequency domain or a time domain, the signal reception apparatus estimates an SINR in the same manner as an MCS level selection scheme for a QAM scheme, and estimates a value of a parameter α using Equation (1). As described in relation to FIG. 15, the signal reception apparatus determines an MCS level corresponding to modulation orders $M_F$ and $M_Q$, and a code rate which are appropriate for the signal reception apparatus, and transmits feedback information indicating the detected MCS level to the signal transmission apparatus.

If the signal transmission apparatus operates the FQAM scheme and the QAM scheme separately by classifying the resource into the frequency domain or the time domain, the signal reception apparatus estimates an SINR and a value of a parameter α for each of an FQAM operation resource for the FQAM scheme and a QAM operation resource for the QAM scheme. Further, the FQAM operation resource may be classified per $M_F$. For example, the FQAM operation resource may be classified into three types of resources. For example, the FQAM operation resource may be classified into a resource for a QAM scheme in the frequency domain and/or the time domain), a resource for a 4F based FQAM scheme, and a resource for an 8F based FQAM scheme.

The signal reception apparatus determines an appropriate MCS level based on the estimated SINR and the estimated value of the parameter α, and feedbacks information indicating the determined MCS level to the signal transmission apparatus, or feedbacks the estimated SINR and the estimated value of the parameter α to the signal transmission apparatus, or feedbacks the feedback information, the estimated SINR, and the estimated value of the parameter α to the signal transmission apparatus. The signal reception apparatus may perform a feedback operation as described above for a plurality of types of resources operated in the signal transmission apparatus.

(2) A Case that a Signal Transmission Apparatus (Base Station) is Considered

The signal transmission apparatus determines a final modulation order to be applied to the signal reception apparatus using an SINR and a parameter α received from the signal reception apparatus.

If the signal transmission apparatus operates a resource without classifying the resource into the FQAM operation resource and the QAM operation resource, the signal transmission apparatus detects whether a message which requests to increase modulation orders $M_F$ or $M_Q$ is received from a neighbor signal transmission apparatus or an upper entity. If the message is received, the signal transmission apparatus determines final modulation orders $M_F$ and $M_Q$ by determining whether to reflect the request.

If the signal transmission apparatus operates a resource by classifying the resource into the FQAM operation resource and the QAM operation resource, the signal transmission apparatus receives feedback information for the FQAM operation resource and the QAM operation resource from the signal reception apparatus, and may determine to apply the FQAM scheme or the QAM scheme to the signal reception apparatus based on the received feedback information.

If the signal transmission apparatus operates the resource without classifying the resource into the FQAM operation resource and the QAM operation resource, the signal transmission apparatus may request at least one neighbor signal transmission apparatus or an upper entity to increase or decrease the modulation orders $M_F$ and/or $M_Q$ of the at least one neighbor signal transmission apparatus or the upper entity using parameters α, β, and δ indicating an interference component received from the signal reception apparatus. A detailed description will be followed.

1) Operation #1

The signal transmission apparatus orders parameters α received from signal reception apparatuses by ascending order according to their values, and determines that an interference that the signal reception apparatuses experience is a normal distribution if each of values of the top A of parameters α is greater than a preset first threshold value (e.g., 'α_threshold1'), and a value of a parameter δ is a preset first value (e.g., '0').

The signal transmission apparatus may decrease the value of the parameter α in order to improve transmission quality, and a detailed description will be followed. The signal transmission apparatus transmits a message which request at least one neighbor signal transmission apparatus to decrease a modulation order $M_F$ to the at least one neighbor signal transmission apparatus or an upper entity. For example, A may be '95%', and the α_threshold1 may be '1.6'. The signal transmission apparatus may preset A and the α_threshold1, or receive A and the α_threshold1 from the upper entity.

2) Operation #2

The signal transmission apparatus orders the parameters α received from the signal reception apparatuses by descending order according to their values, and determines that the interference that the signal reception apparatuses experience is a CGG distribution not the normal distribution if each of values of the top B of parameters α is less than a preset second threshold value (e.g., 'α_threshold2'), and the value of the parameter δ is '0'.

This is a case that each of values of parameters α fed back by most of signal reception apparatuses among the signal reception apparatuses is less than a preset second value, so the signal transmission apparatus transmits a message including information indicating that a neighbor signal transmission apparatus may increase a modulation order $M_F$ to the neighbor signal transmission apparatus or an upper entity in order to improve transmission efficiency of the neighbor signal transmission apparatus. For example, B may be '95%', and the α_threshold2 may be '0.5'.

3) Operation #3

The signal transmission apparatus determines that the interference that the signal reception apparatuses experience is not the CGG distribution if each of values of parameters δ fed back by the most of signal reception apparatuses is a preset second value (e.g., '1'), and transmits information indicating that the interference that the signal reception apparatuses experience is not the CGG distribution to the upper entity.

In the operation #1 to the operation #3, the signal transmission apparatus determines whether a request of increasing or decreasing a modulation order $M_F$ is received from the neighbor signal transmission apparatus or the upper entity. If the request is received, the signal transmission apparatus determines a final modulation order $M_F$ by determining whether to reflect the request.

A detailed description of an operation of determining final modulation orders $M_F$ and $M_Q$ in the controller 700 for the operation #1 to the operation #3 will be followed.

The controller 700 inputs CQI and parameters α, β, and δ, and determines candidate modulation orders $M_F$ and $M_Q$ by comparing the CQI with a link table indicating a link performance per MCS level. The controller 700 determines final modulation orders $M_F$ and $M_Q$ by considering an operating criterion such as information indicating whether a message which requests to change the modulation orders $M_Q$ or $M_F$ is received from at least one neighbor signal transmission apparatus or an upper entity, and whether the signal transmission apparatus reflects the request if the message which requests to change the modulation orders $M_F$ or $M_Q$ is received. The controller 700 determines a code rate and a repetition number to be applied to a signal transmission apparatus.

Figure 8:
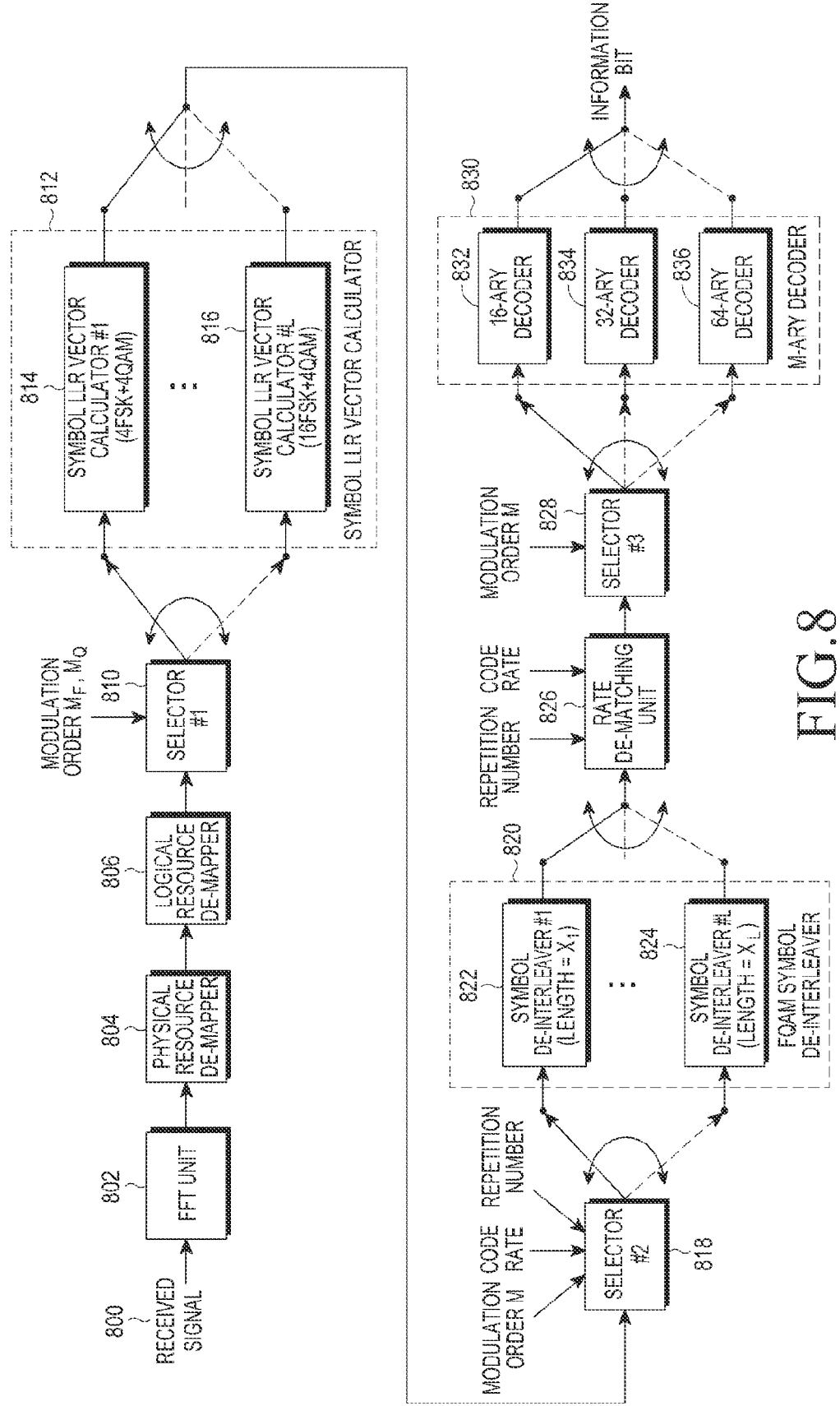
FIG. 8 is a block diagram schematically illustrating an internal structure of a signal reception apparatus supporting an FQAM scheme and an M-ary CM scheme in a communication system according to an embodiment of the present disclosure.

FIG. 8 is a block diagram schematically illustrating an internal structure of a signal reception apparatus supporting an FQAM scheme and an M-ary CM scheme in a communication system according to an embodiment of the present disclosure.

Referring to FIG. 8, the signal reception apparatus includes a Fast Fourier Transform (FFT) unit 802, a physical resource de-mapper 804, a logical resource de-mapper 806, a selector #1 810, a symbol Log Likelihood Ratio (LLR) vector calculator 812, a selector #2 818, an FQAM symbol de-interleaver 820, a rate de-matching unit 826, a selector #3 828, and an M-ary decoder 830. The symbol LLR vector calculator 812 includes a plurality of symbol LLR vector calculators (e.g., L symbol LLR vector calculators such as, for example, a symbol LLR vector calculator #1 814 to a symbol LLR vector calculator #L 816). The FQAM symbol de-interleaver 820 includes a plurality of symbol de-interleavers (e.g., L symbol de-interleavers such as, for example, a symbol de-interleaver #1 822 to a symbol de-interleaver #L 824). The M-ary decoder 830 includes a 16-ary decoder 832, a 32-ary decoder 834, and a 64-ary decoder 836.

Although the FFT unit 802, the physical resource de-mapper 804, the logical resource de-mapper 806, the selector #1 810, the symbol LLR vector calculator 812, the selector #2 818, the FQAM symbol de-interleaver 820, the rate de-matching unit 826, the selector #3 828, and the M-ary decoder 830 are shown in FIG. 8 as separate units, it is to be understood that such a configuration is for merely convenience of description. In other words, two or more of the FFT unit 802, the physical resource de-mapper 804, the logical resource de-mapper 806, the selector #1 810, the symbol LLR vector calculator 812, the selector #2 818, the FQAM symbol de-interleaver 820, the rate de-matching unit 826, the selector #3 828, and the M-ary decoder 830 may be incorporated into a single unit. Further, locations of the FFT unit 802, the physical resource de-mapper 804, the logical resource de-mapper 806, the selector #1 810, the symbol LLR vector calculator 812, the selector #2 818, the FQAM symbol de-interleaver 820, the rate de-matching unit 826, the selector #3 828, and the M-ary decoder 830 may be changed, and specific units among these units may be omitted.

A received signal 800 is inputted to the FFT unit 802, and the FFT unit 802 generates a frequency-domain signal by performing an FFT operation on the received signal 800, and outputs the frequency-domain signal to the physical resource de-mapper 804. The physical resource de-mapper 804 detects a physical resource mapping signal which is mapped to a preset physical resource from the frequency-domain signal outputted from the FFT unit 802, and outputs the physical resource mapping signal to the logical resource de-mapper 806. The logical resource de-mapper 806 detects a logical resource mapping signal which is mapped to a preset logical resource from the physical frequency mapping signal outputted from the resource de-mapper 804, and outputs the logical resource mapping signal to the selector #1 810.

The selector #1 810 outputs the logical resource mapping signal outputted from the logical resource de-mapper 806 according to modulation orders used in a signal transmission apparatus (e.g., modulation orders $M_F$ and $M_Q$ to the symbol LLR vector calculator 812). For example, if the received signal 800 is determined to be transmitted using a modulation scheme based on a 4FSK scheme and a 4QAM scheme (e.g., an FQAM scheme based on the 4FSK scheme and the 4QAM scheme according to the modulation orders $M_F$ and $M_Q$), the selector #1 810 outputs the logical resource mapping signal outputted from the logical resource de-mapper 806 to the symbol LLR vector calculator #1 814. If the received signal 800 is determined to be transmitted using a modulation scheme based on a 16FSK scheme and a 4-QAM scheme (e.g., an FQAM scheme based on the 16FSK scheme and the 4-QAM scheme), the selector #1 810 outputs the logical resource mapping signal outputted from the logical resource de-mapper 806 to the symbol LLR vector calculator #L 816. Although not shown in FIG. 8, the selector #1 810 outputs the received signal 800 to a related symbol LLR vector calculator among a symbol LLR vector calculator #2 to a symbol LLR vector calculator #L−1 if the received signal 800 is determined to be transmitted using one of a modulation scheme based on a 2FSK scheme and an 8QAM scheme (e.g., an FQAM scheme based on the 2FSK scheme and the 8-QAM scheme), a modulation scheme based on an 8FSK scheme and a 2-QAM scheme (e.g., an FQAM scheme based on the 8FSK scheme and the 2-QAM scheme), and a modulation scheme based on an 8FSK scheme and an 8-QAM scheme (e.g., an FQAM scheme based on the 8FSK scheme and the 8-QAM scheme).

The symbol LLR vector calculator 812 calculates LLR values for symbols to desire to recover from the received signal 800 according to a modulation order of an FQAM scheme (e.g., modulation orders $M_F$ and $M_Q$). The modulation orders $M_F$ and $M_Q$ may be notified from a signal transmission apparatus to the signal reception apparatus. For example, if the communication system is an LTE mobile communication system, the modulation orders $M_F$ and $M_Q$ may be previously notified through a Physical Downlink Control Channel (PDCCH).

The selector #2 818 outputs the LLR values for the symbols outputted from the symbol LLR vector calculator 812 to the FQAM symbol de-interleaver 820 by considering a modulation order M, a code rate, and a repetition number applied to the symbols in a signal transmission apparatus. For example, the selector #2 818 outputs the LLR values for the symbols outputted from the symbol LLR vector calculator 812 to one of the symbol de-interleaver #1 822 to the symbol de-interleaver #L 824 by considering the modulation order M, the code rate, and the repetition number applied to the symbols in the signal transmission apparatus. Each of the symbol de-interleaver #1 822 to the symbol de-interleaver #L 824 generates de-interleaved values by de-interleaving the LLR values for the symbols according to a de-interleaving pattern corresponding to an interleaving pattern used in an FQAM symbol interleaver 620 included in the signal transmission apparatus, and outputs the de-interleaved values to the rate de-matching unit 826. For example, each of the symbol de-interleaver #1 822 to the symbol de-interleaver #L 824 de-interleaves the LLR values for the symbols on a symbol basis according to a preset length, and outputs the de-interleaved values to the rate de-matching unit 826. For example, a length used in the symbol de-interleaver #1 822 is $X_1$, and a length used in the symbol de-interleaver #L 824 is $X_L$.

The rate de-matching unit 826 generates rate de-matched values by combining the de-interleaved values on a symbol basis corresponding to a rate matching operation performed in a rate matching unit 612 included in the signal transmission apparatus, and outputs the rate de-matched values to the selector #2 838. The rate de-matching unit 826 performs the rate de-matching operation according to a repetition number and a code rate used in the signal transmission apparatus. The selector #2 838 outputs the rate de-matched values to the M-ary decoder 830 according to a modulation order M used in the signal transmission apparatus.

The M-ary decoder 830 recovers m=log 2 (M) information bits by M-ary decoding the rate de-matched values outputted from the selector #3 828, and outputs the information bits. For example, the 16-ary decoder 832 recovers 4 information bits by 16-ary decoding the rate de-matched values, the 32-ary decoder 834 recovers 5 information bits by 32-ary decoding the rate de-matched values, and the 64-ary decoder 836 recovers 6 information bits by 64-ary decoding the rate de-matched values.

Figure 9:
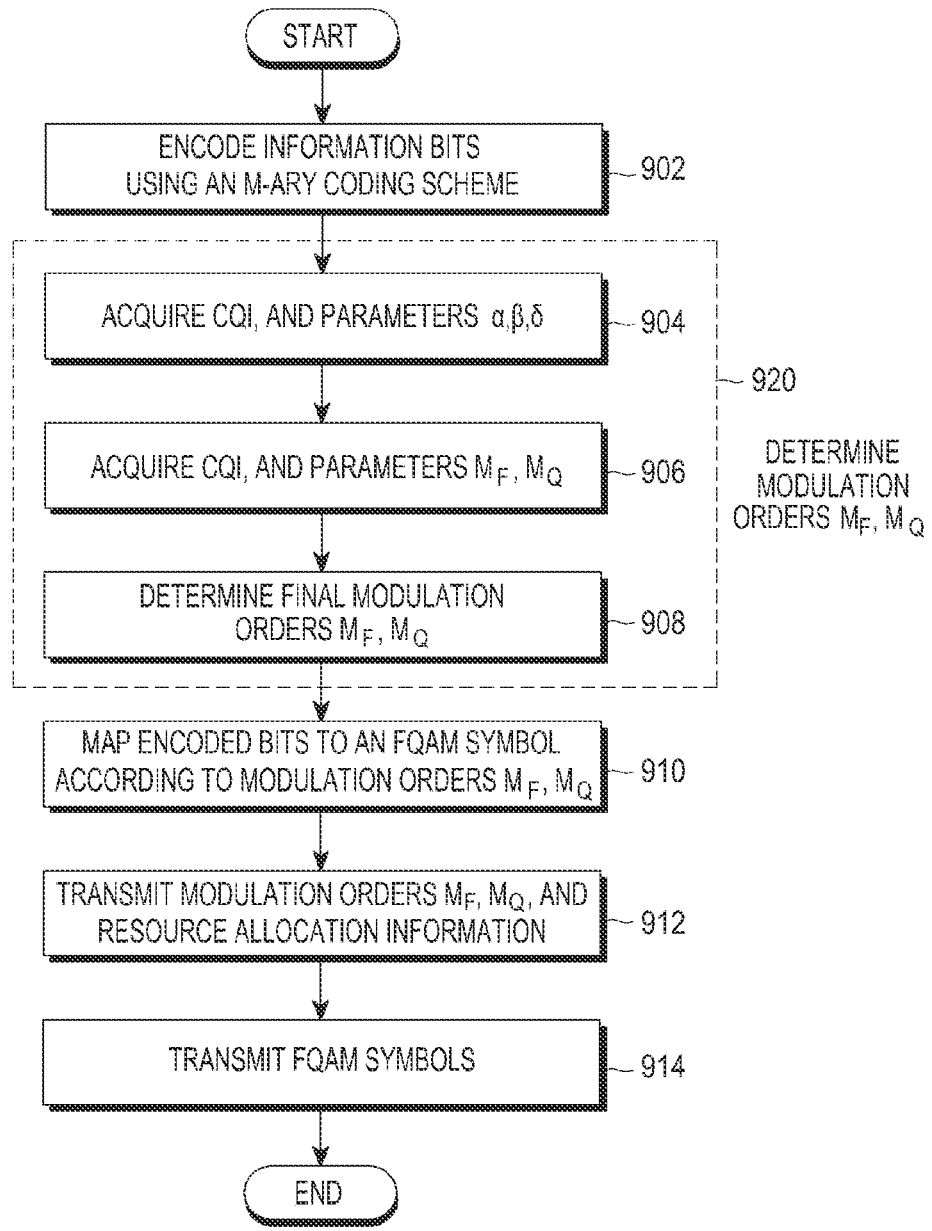
FIG. 9 is a flowchart schematically illustrating an operation of a signal transmission apparatus supporting an FQAM scheme and an M-ary CM scheme in a communication system according to an embodiment of the present disclosure.

FIG. 9 is a flowchart schematically illustrating an operation of a signal transmission apparatus supporting an FQAM scheme and an M-ary CM scheme in a communication system according to an embodiment of the present disclosure.

Referring to FIG. 9, at operation 902, a signal transmission apparatus generates a coded bit stream by encoding information bits using an M-ary coding scheme. Thereafter, the signal transmission apparatus proceeds to operation 920. (e.g., a modulation order determining operation).

At operation 920, the signal transmission apparatus determines a modulation order. The operation 920 includes operation 904 to operation 908, and will be described below.

At operation 904, the signal transmission apparatus acquires CQI and parameters α, β, and δ indicating an interference component as feedback information of a signal reception apparatus.

At operation 906, the signal transmission apparatus determines candidate modulation orders $M_F$ and $M_Q$. For example, the signal transmission apparatus determines candidate modulation orders $M_F$ and $M_Q$ by comparing a link table indicating a value of a link performance for each MCS level with the CQI.

At operation 908, the signal transmission apparatus determines final modulation orders $M_F$ and $M_Q$. For example, the signal transmission apparatus determines final modulation orders $M_F$ and $M_Q$ by considering an operating criterion such as information indicating whether a message which requests to change the modulation orders $M_Q$ or $M_F$ is received from at least one neighbor signal transmission apparatus or an upper entity, and whether the signal transmission apparatus reflects the request if the message which requests to change the modulation orders $M_F$ or $M_Q$ is received from the at least one neighbor signal transmission apparatus or the upper entity.

At operation 910, the signal transmission apparatus maps the encoded bits to an FQAM symbol according to the determined modulation orders $M_F$ and $M_Q$.

At operation 912, the signal transmission apparatus transmits the modulation orders $M_F$ and $M_Q$, and resource allocation information. For example, the signal transmission apparatus transmits the modulation orders $M_F$ and $M_Q$, and resource allocation information on a resource allocated for a signal to be transmitted to a signal transmission apparatus.

At operation 914, the signal transmission apparatus transmits the FQAM symbols. For example, the signal transmission apparatus transmits the FQAM symbols through a preset resource (e.g., a resource which is indicated by the resource allocation information).

Referring to FIG. 9, an operation of transmitting FQAM symbols to which information bits are mapped in a signal transmission apparatus has been described. However it will be understood by those of ordinary skill in the art that the signal transmission apparatus may request at least one neighbor signal transmission apparatus or an upper entity to increase the modulation orders $M_F$, or $M_Q$ by considering the parameters α and δ, and the request operation of the signal transmission apparatus is performed in the manner described before, so a detailed description thereof will be omitted herein.

Although FIG. 9 illustrates an operation of a signal transmission apparatus supporting an FQAM scheme and an M-ary CM scheme in a communication system according to various embodiments of the present disclosure, various changes could be made to FIG. 9. For example, although shown as a series of operations, according to various embodiments of the present disclosure, various operations in FIG. 9 could overlap, occur in parallel, occur in a different order, or occur multiple times.

Figure 10:
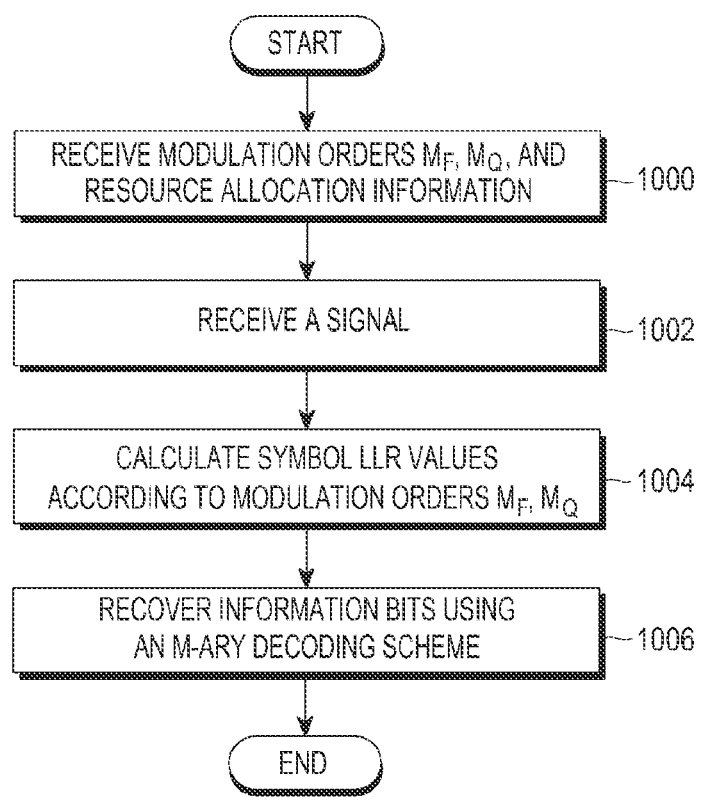
FIG. 10 schematically illustrates an operation of a signal reception apparatus supporting an FQAM scheme and an M-ary CM scheme in a communication system according to an embodiment of the present disclosure.

FIG. 10 schematically illustrates an operation of a signal reception apparatus supporting an FQAM scheme and an M-ary CM scheme in a communication system according to an embodiment of the present disclosure.

Referring to FIG. 10, at operation 1000, the signal reception apparatus receives modulation orders $M_F$ and $M_Q$, and resource allocation information for a resource allocated to a signal to be received from a signal transmission apparatus.

At operation 1002, the signal reception apparatus receives a signal transmitted from the signal transmission apparatus through an allocated resource (e.g., a resource which the resource allocation information indicates).

At operation 1004, the signal reception apparatus calculates symbol LLR values for symbols to desire to recover from a received signal according to the modulation orders $M_F$ and $M_Q$.

At operation 1006, the signal reception apparatus recovers information bits by decoding the symbol LLR values using an M-ary decoding scheme.

Referring to FIG. 10, an operation of receiving a signal and recovering information bits from the received signal in a signal reception apparatus has been described, however it will be understood by those of ordinary skill in the art that the signal reception apparatus may feedback a CQI and parameters α, β, and δ to a signal transmission apparatus upon receiving a request for feedback of the CQI and the parameters α, β, and δ from the signal transmission apparatus.

Although FIG. 10 illustrates an operation of a signal reception apparatus supporting an FQAM scheme and an M-ary CM scheme in a communication system according to various embodiments of the present disclosure, various changes could be made to FIG. 10. For example, although shown as a series of operations, according to various embodiments of the present disclosure, various operations in FIG. 10 could overlap, occur in parallel, occur in a different order, or occur multiple times.

Figure 11:
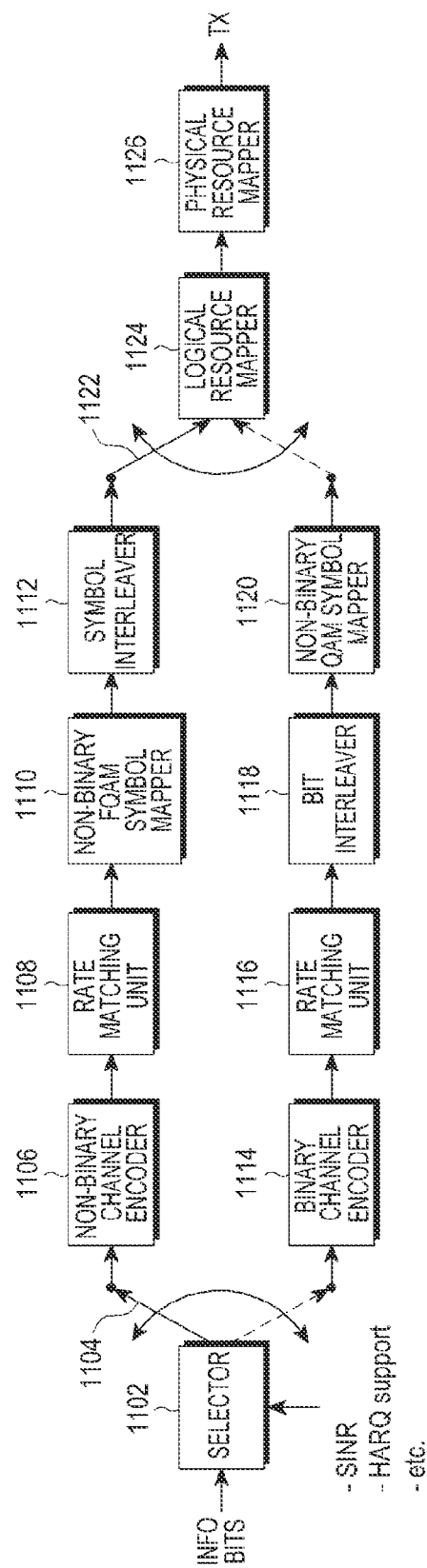
FIG. 11 illustrates a block diagram of an example of an internal structure of a signal transmission apparatus supporting a QAM scheme and an FQAM scheme in a communication system according to an embodiment of the present disclosure.

FIG. 11 illustrates a block diagram of an example of an internal structure of a signal transmission apparatus supporting a QAM scheme and an FQAM scheme in a communication system according to an embodiment of the present disclosure.

Referring to FIG. 11, the signal transmission apparatus includes a selector 1102, a switch 1104, a non-binary channel encoder 1106, a rate matching unit 1108, a non-binary FQAM symbol mapper 1110, a symbol interleaver 1112, a binary channel encoder 1114, a rate matching unit 1116, a bit interleaver 1118, a non-binary QAM symbol mapper 1120, a switch 1122, a logical resource mapper 1124, and a physical resource mapper 1126.

Although the selector 1102, the switch 1104, the non-binary channel encoder 1106, the rate matching unit 1108, the non-binary FQAM symbol mapper 1110, the symbol interleaver 1112, the binary channel encoder 1114, the rate matching unit 1116, the bit interleaver 1118, the non-binary QAM symbol mapper 1120, the switch 1122, the logical resource mapper 1124, and the physical resource mapper 1126 are shown in FIG. 11 as separate units, it is to be understood that such a configuration is for merely convenience of description. In other words, two or more of the selector 1102, the switch 1104, the non-binary channel encoder 1106, the rate matching unit 1108, the non-binary FQAM symbol mapper 1110, the symbol interleaver 1112, the binary channel encoder 1114, the rate matching unit 1116, the bit interleaver 1118, the non-binary QAM symbol mapper 1120, the switch 1122, the logical resource mapper 1124, and the physical resource mapper 1126 may be incorporated into a single unit. Further, locations of the selector 1102, the switch 1104, the non-binary channel encoder 1106, the rate matching unit 1108, the non-binary FQAM symbol mapper 1110, the symbol interleaver 1112, the binary channel encoder 1114, the rate matching unit 1116, the bit interleaver 1118, the non-binary QAM symbol mapper 1120, the switch 1122, the logical resource mapper 1124, and the physical resource mapper 1126 may be changed, and specific units among these units may be omitted.

As illustrated in FIG. 11, a non-binary channel coding scheme is used for the FQAM scheme, and a binary channel coding scheme is used for the QAM scheme.

Referring to FIG. 11, the selector 1102 selects a modulation scheme according to at least one preset criterion such as, for example, an SINR fed back from a signal reception apparatus, information indicating whether the signal reception apparatus supports a Hybrid Automatic Repeat and request (HARQ) scheme, a performance of the signal reception apparatus, and/or the like. Information bits inputted to the selector 1102 are outputted to one of an FQAM path and a QAM path through the switch 1104 according to the selected modulation scheme. The FQAM path includes the non-binary channel encoder 1106, the rate matching unit 1108, the non-binary FQAM symbol mapper 1110, and the symbol interleaver 1112, and the QAM path includes the binary channel encoder 1114, the rate matching unit 1116, the bit interleaver 1118, and the non-binary QAM symbol mapper 1120.

The selector 1102 may operate as a controller which determines a modulation order(s) for a QAM scheme and/or an FSK scheme, a code rate, a repetition number, and the like as well as a modulation order based on preset channel state information and additional parameters.

If the selector 1102 determines to transmit information bits using an FQAM scheme, the information bits are inputted to an M-ary channel encoder included in the FQAM path (e.g., the non-binary channel encoder 1106). Herein, M is an integer greater than 2. The non-binary channel encoder 1106 is configured to generate a parity bit for a plurality of input bits compared to a binary channel encoder configured to generate a parity bit for one input bit. For example, the non-binary channel encoder 1106 is configured by connecting two Recursive Systematic Convolutional Codes (RSCCs) in parallel and simultaneously generates a parity bit using a plurality of bits. For example, the non-binary channel encoder 1106 may be configured as one of a 16-ary turbo encoder, a 32-ary turbo encoder, and a 64-ary turbo encoder. In contrast, one of the 16-ary turbo encoder, the 32-ary turbo encoder, and the 64-ary turbo encoder may be omitted, or other turbo encoder may be replaced with one of the 16-ary turbo encoder, the 32-ary turbo encoder, and the 64-ary turbo encoder, or may be additionally used with the 16-ary turbo encoder, the 32-ary turbo encoder, and the 64-ary turbo encoder. The code rate may be determined according to an MCS level which is determined in order to satisfy a Frame Error Rate (FER) according to estimation values indicating a channel state (e.g., an SNR, an SINR, and/or the like).

A bit stream outputted from the non-binary channel encoder 1106 is inputted to the rate matching unit 1108, and the rate matching unit 1108 generates a bit stream with a desired transmission rate using a preset rate matching scheme, and outputs the bit stream to the non-binary FQAM symbol mapper 1110. The non-binary FQAM symbol mapper 1110 maps a rate matched bit stream to M-ary FQAM symbols using a non-binary FQAM symbol mapping scheme outputted from the rate matching unit 1108, and outputs the M-ary FQAM symbols to the symbol interleaver 1112. The non-binary FQAM symbol mapper 1110 generates an M-ary FQAM symbol stream by mapping a predetermined number (e.g., $M=M_Q*M_F$) of bit groups among bits included in the rate matched bit stream to an M-ary FQAM symbol according to a preset modulation order (e.g., a modulation order M of an FQAM scheme based on a modulation order $M_Q$ of a QAM scheme and a modulation order $M_F$ of an FSK scheme), and outputs the M-ary FQAM symbol stream to the symbol interleaver 1112. The modulation order may be determined according to an MCS level which is determined to satisfy a target FER according to estimation values indicating a channel state (e.g., an SNR, an SINR, and/or the like).

The symbol interleaver 1112 generates an interleaved symbol stream by interleaving the non-binary FQAM symbol stream outputted from the non-binary FQAM symbol mapper 1110 according to a preset interleaving pattern, and outputs the interleaved symbol stream to the switch 1122. The switch 1122 outputs the interleaved symbol stream outputted from the symbol interleaver 1112 to the logical resource mapper 1124. The symbol interleaver 1112 is configured to operate by considering at least one of the modulation order, a preset code rate, and a repetition number.

The logical resource mapper 1124 generates a logical resource mapping symbol stream by mapping an inputted symbol stream to a preset logical resource, and outputs the logical resource mapping symbol stream to the physical resource mapper 1126. The physical resource mapper 1126 generates a physical resource mapping symbol stream by mapping the logical resource mapping symbol stream to a preset physical resource, and outputs the physical resource mapping symbol stream. The logical resource mapper 1124 allocates the inputted symbol streams to a related frequency tone or a related subcarrier by considering an FQAM scheme, specially an FSK scheme. The physical resource mapping symbol stream outputted from the physical resource mapper 1126 is transmitted to an air through a related physical resource.

In contrast, if the selector 1102 determines to transmit the information bits using the QAM scheme, the information bits are inputted to the binary channel encoder 1114 included in the QAM path. The binary channel encoder 1114 generates an encoded bit stream by binary channel encoding the information bits according to a preset binary channel coding scheme, and outputs the encoded bit stream to the rate matching unit 1116. The rate matching unit 1116 generates a bit stream with a preset transmission rate by performing a preset rate matching operation on the encoded bit stream outputted from the binary channel encoder 1114, and outputs the bit stream to the bit interleaver 1118. The bit interleaver 1118 generates an interleaved bit stream by interleaving the bit stream outputted from the rate matching unit 1116 according to a preset interleaving pattern, and outputs the interleaved bit stream to the non-binary QAM symbol mapper 1120. The bit interleaver 1118 may be configured to operate by considering at least one of a code rate, and a repetition number.

The non-binary QAM symbol mapper 1120 generates a non-binary QAM symbol stream by mapping a predetermined number (M) of bits among bits included in the interleaved stream to a non-binary QAM symbol according to a preset modulation order M, and outputs the non-binary QAM symbol stream to the logical resource mapper 1124 through the switch 1122. The modulation order M may be determined according to an MCS level which is determined to satisfy a target FER according to estimation values indicating a channel state (e.g., an SNR, an SINR, and/or the like). The logical resource mapper 1124 generates a logical resource mapping symbol stream by mapping an inputted symbol stream to a preset logical resource, and outputs the logical resource mapping symbol stream to the physical resource mapper 1126. The physical resource mapper 1126 generates a physical resource mapping symbol stream by mapping the logical resource mapping symbol stream to a preset physical resource, and outputs the physical resource mapping symbol stream. The physical resource mapping symbol stream outputted from the physical resource mapper 1126 is transmitted to a signal reception apparatus through an additional processing. A detailed description of the additional processing will be omitted herein.

Figure 12:
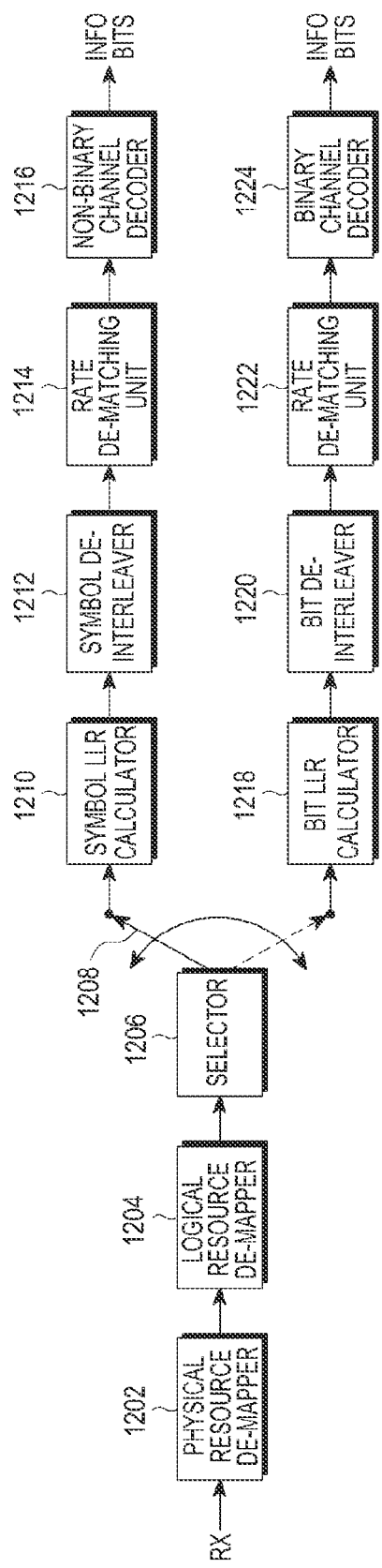
FIG. 12 is a block diagram schematically illustrating an example of an internal structure of a signal reception apparatus supporting a QAM scheme and an FQAM scheme in a communication system according to an embodiment of the present disclosure.

FIG. 12 is a block diagram schematically illustrating an example of an internal structure of a signal reception apparatus supporting a QAM scheme and an FQAM scheme in a communication system according to an embodiment of the present disclosure.

Referring to FIG. 12, the signal reception apparatus includes a physical resource de-mapper 1202, a logical resource de-mapper 1204, a selector 1206, a switch 1208, a symbol LLR calculator 1210, a symbol de-interleaver 1212, a rate de-matching unit 1214, a non-binary channel decoder 1216, a bit LLR calculator 1218, a bit de-interleaver 1220, a rate de-matching unit 1222, and a binary channel decoder 1224.

Although the physical resource de-mapper 1202, the logical resource de-mapper 1204, the selector 1206, the switch 1208, the symbol LLR calculator 1210, the symbol de-interleaver 1212, the rate de-matching unit 1214, the non-binary channel decoder 1216, the bit LLR calculator 1218, the bit de-interleaver 1220, the rate de-matching unit 1222, and the binary channel decoder 1224 are shown in FIG. 12 as separate units, it is to be understood that such a configuration is for merely convenience of description. In other words, two or more of the physical resource de-mapper 1202, the logical resource de-mapper 1204, the selector 1206, the switch 1208, the symbol LLR calculator 1210, the symbol de-interleaver 1212, the rate de-matching unit 1214, the non-binary channel decoder 1216, the bit LLR calculator 1218, the bit de-interleaver 1220, the rate de-matching unit 1222, and the binary channel decoder 1224 may be incorporated into a single unit. Further, locations of the physical resource de-mapper 1202, the logical resource de-mapper 1204, the selector 1206, the switch 1208, the symbol LLR calculator 1210, the symbol de-interleaver 1212, the rate de-matching unit 1214, the non-binary channel decoder 1216, the bit LLR calculator 1218, the bit de-interleaver 1220, the rate de-matching unit 1222, and the binary channel decoder 1224 may be changed, and specific units among these units may be omitted.

Referring to FIG. 12, a non-binary channel decoding scheme is used for receiving a signal which is modulated using an FQAM scheme, and a binary channel decoding scheme is used for receiving a signal which is modulated using a QAM scheme.

Referring to FIG. 12, the physical resource de-mapper 1202 detects a physical resource mapping signal mapped to a preset physical resource from a received signal, and outputs the physical resource mapping signal to the logical resource de-mapper 1204. The logical resource de-mapper 1204 detects a logical resource mapping signal mapped to a preset logical resource from the physical resource mapping signal, and outputs the logical resource mapping signal to the selector 1206. The selector 1206 selects a modulation scheme identical to a modulation scheme used in a signal transmission apparatus according to an indication from the signal transmission apparatus. The signal detected by the logical resource demapper 1204 is outputted to one of an FQAM path and a QAM path through the switch 1208. The FQAM path includes the symbol LLR calculator 1210, the symbol de-interleaver 1212, the rate de-matching unit 1214, the non-binary channel decoder 1216, and the QAM path includes the bit LLR calculator 1218, the bit de-interleaver 1220, the rate de-matching unit 1222, and the binary channel decoder 1224.

The selector 1206 may operate as a controller which determines a modulation order(s) for a QAM scheme and/or an FSK scheme, a code rate, a repetition number, and the like as well as a modulation order using a selection algorithm identical to a selection algorithm used in the signal transmission apparatus based on preset channel state information and additional parameters.

If a received signal is transmitted using an FQAM scheme, the received signal is inputted to the symbol LLR calculator 1210 included in the FQAM path. The symbol LLR calculator 1210 calculates LLR values for symbols to desire to recover from the received signal according to a modulation order of the FQAM scheme. The symbol de-interleaver 1212 generates de-interleaved values by de-interleaving the LLR values for symbols according to a de-interleaving pattern corresponding to an interleaving pattern used in a symbol interleaver 1112 included in the signal transmission apparatus, and outputs the de-interleaved values to the rate de-matching unit 1214. The rate de-matching unit 1214 generates rate de-matched values by combining the de-interleaved values on a symbol basis corresponding to a reverse operation for a rate matching operation performed in a rate matching unit 1108 included in the signal transmission apparatus, and outputs the rate de-matched values to the non-binary channel decoder 1216. The symbol de-interleaver 1212 may be configured to operate by considering at least one of a modulation order, a code rate, and a repetition number used in the signal transmission apparatus. The rate de-matching unit 1214 operates according to the repetition number and the code rate used in the signal transmission apparatus.

The non-binary channel decoder 1216 recovers information bits by performing a channel decoding operation on the rate de-matched values according to a modulation order and a code rate used in a non-binary channel encoder 1106 included in the signal transmission apparatus. The non-binary channel decoder 1216 may be configured as one of a 16-ary turbo decoder, a 32-ary turbo decoder, and a 64-ary turbo decoder according to a type of the non-binary channel encoder 1106.

In contrast, if the received signal is transmitted using a QAM scheme, the received signal is inputted to the bit LLR calculator 1218 included in the QAM path. The bit LLR calculator 1218 calculates LLR values for bits to desire to recover from the received signal according to a modulation order of the QAM scheme, and outputs the LLR values for bits to the bit de-interleaver 1220. The bit de-interleaver 1220 generates de-interleaved values by de-interleaving the bit LLR values according to a de-interleaving pattern corresponding to an interleaving pattern used in a symbol interleaver 1118 included in the signal transmission apparatus, and outputs the de-interleaved values to the rate de-matching unit 1222. The rate de-matching unit 1222 generates rate de-matched values by combining the de-interleaved values on a symbol basis corresponding to a reverse operation for a rate matching operation performed in a rate matching unit 1116 included in the signal transmission apparatus, and outputs the rate de-matched values to the bit de-interleaver 1220. The bit de-interleaver 1220 may be configured to operate by considering at least one of a code rate, and a repetition number used in the signal transmission apparatus. The rate de-matching unit 1222 may operate according to the repetition number and the code rate used in the signal transmission apparatus.

The binary channel decoder 1224 recovers information bits by performing a channel decoding operation on the rate de-matched values according to a code rate used in a binary channel encoder 1114 included in the signal transmission apparatus.

Figure 13:
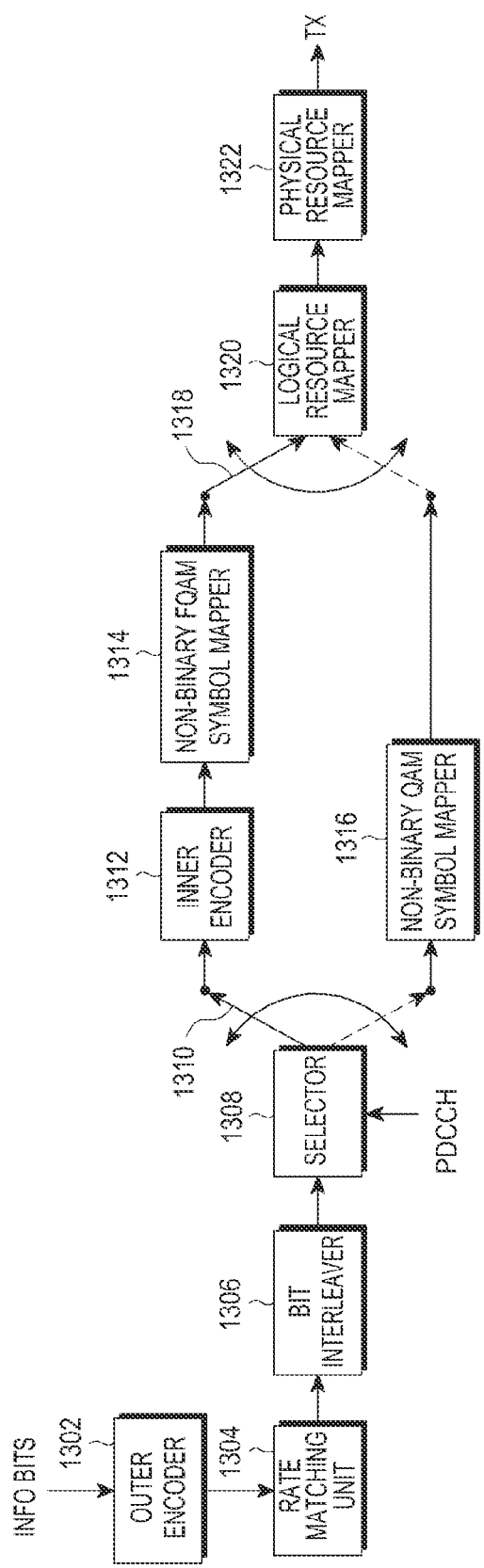
FIG. 13 is a block diagram schematically illustrating an example of an internal structure of a signal transmission apparatus supporting a QAM scheme and an FQAM scheme in a communication system according to an embodiment of the present disclosure.

FIG. 13 is a block diagram schematically illustrating an example of an internal structure of a signal transmission apparatus supporting a QAM scheme and an FQAM scheme in a communication system according to an embodiment of the present disclosure.

Referring to FIG. 13, the signal transmission apparatus includes an outer encoder 1302, a rate matching unit 1304, a bit interleaver 1306, a selector 1308, a switch 1310, an inner encoder 1312, a non-binary FQAM symbol mapper 1314, a non-binary QAM symbol mapper 1316, a switch 1318, a logical resource mapper 1320, and a physical resource mapper 1322.

Although the outer encoder 1302, the rate matching unit 1304, the bit interleaver 1306, the selector 1308, the switch 1310, the inner encoder 1312, the non-binary FQAM symbol mapper 1314, the non-binary QAM symbol mapper 1316, the switch 1318, the logical resource mapper 1320, and the physical resource mapper 1322 are shown in FIG. 13 as separate units, it is to be understood that such a configuration is for merely convenience of description. In other words, two or more of the outer encoder 1302, the rate matching unit 1304, the bit interleaver 1306, the selector 1308, the switch 1310, the inner encoder 1312, the non-binary FQAM symbol mapper 1314, the non-binary QAM symbol mapper 1316, the switch 1318, the logical resource mapper 1320, and the physical resource mapper 1322 may be incorporated into a single unit. Further, locations of the outer encoder 1302, the rate matching unit 1304, the bit interleaver 1306, the selector 1308, the switch 1310, the inner encoder 1312, the non-binary FQAM symbol mapper 1314, the non-binary QAM symbol mapper 1316, the switch 1318, the logical resource mapper 1320, and the physical resource mapper 1322 may be changed, and specific units among these units may be omitted.

In a structure of a signal transmission apparatus in FIG. 13, a specific channel coding scheme (e.g., a non-binary channel coding scheme) is basically used regardless of a used modulation scheme, and an additional channel encoding scheme is used for an FQAM scheme.

Referring to FIG. 13, the outer encoder 1302 generates an encoded bit stream #1 by encoding information bits inputted to the outer encoder 1302 using a preset outer coding scheme, and outputs the encoded bit stream #1 to the rate matching unit 1304. For example, the outer coding scheme used in the outer encoder 1302 may be one of a turbo code scheme, a Low Density Parity Check (LDPC) code scheme, a convolutional code scheme, a Repeat-Accumulate (RA) code scheme, and the like. The rate matching unit 1304 generates a rate matched bit stream with a preset transmission rate by performing a rate matching operation corresponding to a preset rate matching scheme on the encoded bit stream #1, and outputs the rate matched bit stream to the bit interleaver 1306. The bit interleaver 1306 generates an interleaved bit stream by performing an interleaving operation according to a preset interleaving pattern on the rate matched bit stream, and outputs the interleaved bit stream to the selector 1308.

The selector 1308 selects a modulation scheme according to at least one preset criterion such as a received SINR fed back from a signal reception apparatus, information indicating whether the signal reception apparatus supports a Hybrid Automatic Repeat reQuest (HARQ) scheme, and a performance of the signal reception apparatus. The selector 1308 outputs the interleaved bit stream inputted to the selector 1308 to one of an FQAM path and a QAM path through the switch 1310 according to the selected modulation scheme. The FQAM path includes the inner encoder 1312, and the non-binary FQAM symbol mapper 1314, and the QAM path includes the non-binary QAM symbol mapper 1316.

The selector 1308 may operate as a controller which determines a modulation order(s) for a QAM scheme and/or an FSK scheme, a code rate, and the like, as well as the modulation order based on preset channel state information and additional parameters.

Meanwhile, if the FQAM scheme is selected, the interleaved bit stream is inputted to the inner encoder 1312 included in the FQAM path. The inner encoder 1312 generates an encoded bit stream #2 by encoding the interleaved bit stream using a preset inner coding scheme, and outputs the encoded bit stream #2 to the non-binary FQAM symbol mapper 1314. For example, the inner coding scheme for the inner encoder 1312 may be a Trellis code scheme. The non-binary FQAM symbol mapper 1314 generates M-ary FQAM symbols by symbol mapping the encoded bit stream #2 generated by the inner encoder 1312 corresponding to a preset non-binary FQAM symbol mapping scheme, and outputs the M-ary FQAM symbols to the logical resource mapper 1320 through the switch 1318. The non-binary FQAM symbol mapper 1314 generates a non-binary FQAM symbol stream by mapping a predetermined number (e.g., $M=M_Q*M_F$) of bit groups among bit groups included in the encoded bit stream #2 to a non-binary FQAM symbol according to a preset modulation order (e.g., a modulation order M of an FQAM scheme based on a modulation order $M_Q$ of a QAM scheme and a modulation order $M_F$ of an FSK scheme), and outputs the generated non-binary FQAM symbol stream to the logical resource mapper 1320 through the switch 1318. The modulation order may be determined according to an MCS level which is determined to satisfy a target FER according to estimation values indicating a channel state (e.g., an SNR, an SINR, and/or the like).

The non-binary FQAM symbol stream generated by the non-binary FQAM symbol mapper 1320 is inputted to the logical resource mapper 1320. The logical resource mapper 1320 generates a logical resource mapping symbol stream by mapping an inputted non-binary FQAM symbol stream to a preset logical resource, and outputs the logical resource mapping symbol stream to the physical resource mapper 1322. The physical resource mapper 1322 generates a physical resource mapping symbol stream by mapping the logical resource mapping symbol stream to a preset physical resource, and outputs the physical resource mapping symbol stream. The logical resource mapper 1320 allocates the inputted non-binary FQAM symbol streams to a related frequency tone or a related subcarrier by considering an FQAM scheme, particularly, an FSK scheme. The physical resource mapping symbol stream outputted from the physical resource mapper 1322 is transmitted to a signal reception apparatus through an additional processing. A detailed description of the additional processing will be omitted herein.

In contrast, if the QAM scheme is selected, the interleaved bit stream is inputted to non-binary QAM symbol mapper 1316 included in the QAM path. The non-binary QAM symbol mapper 1316 generates a non-binary QAM symbol stream by mapping a predetermined number (M) of bit groups among bit groups included in the interleaved bit stream to a non-binary QAM symbol according to a preset modulation order M, and outputs the generated non-binary QAM symbol stream to the logical resource mapper 1320 through the switch 1318. The modulation orders may be determined according to an MCS level which is determined to satisfy a target FER according to estimation values indicating a channel state (e.g., an SNR, an SINR, and/or the like).

The logical resource mapper 1320 generates a logical resource mapping symbol stream by mapping an inputted non-binary QAM symbol stream to a preset logical resource, and outputs the logical resource mapping symbol stream to the physical resource mapper 1322. The physical resource mapper 1322 generates a physical resource mapping symbol stream by mapping the logical resource mapping symbol stream to a preset physical resource, and outputs the physical resource mapping symbol stream. The physical resource mapping symbol stream outputted from the physical resource mapper 1322 is transmitted to a signal reception apparatus through an additional processing. A detailed description of the additional processing will be omitted.

Figure 14:
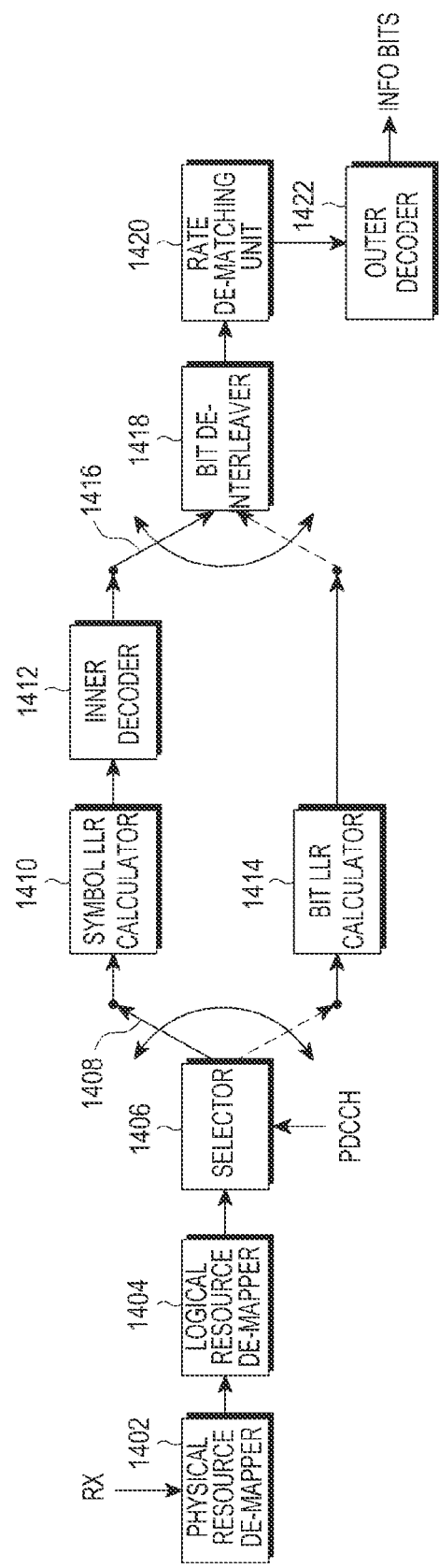
FIG. 14 is a block diagram schematically illustrating an example of an internal structure of a signal reception apparatus supporting a QAM scheme and an FQAM scheme in a communication system according to an embodiment of the present disclosure.

FIG. 14 is a block diagram schematically illustrating an example of an internal structure of a signal reception apparatus supporting a QAM scheme and an FQAM scheme in a communication system according to an embodiment of the present disclosure.

Referring to FIG. 14, the signal reception apparatus includes a physical resource de-mapper 1402, a logical resource de-mapper 1404, a selector 1406, a switch 1408, a symbol LLR calculator 1410, an inner decoder 1412, a bit LLR calculator 1414, a switch 1416, a bit de-interleaver 1418, a rate de-matching unit 1420, and an outer decoder 1422.

Although the physical resource de-mapper 1402, the logical resource de-mapper 1404, the selector 1406, the switch 1408, the symbol LLR calculator 1410, the inner decoder 1412, the bit LLR calculator 1414, the switch 1416, the bit de-interleaver 1418, the rate de-matching unit 1420, and the outer decoder 1422 are shown in FIG. 14 as separate units, it is to be understood that such a configuration is for merely convenience of description. In other words, two or more of the physical resource de-mapper 1402, the logical resource de-mapper 1404, the selector 1406, the switch 1408, the symbol LLR calculator 1410, the inner decoder 1412, the bit LLR calculator 1414, the switch 1416, the bit de-interleaver 1418, the rate de-matching unit 1420, and the outer decoder 1422 may be incorporated into a single unit. Further, locations of the physical resource de-mapper 1402, the logical resource de-mapper 1404, the selector 1406, the switch 1408, the symbol LLR calculator 1410, the inner decoder 1412, the bit LLR calculator 1414, the switch 1416, the bit de-interleaver 1418, the rate de-matching unit 1420, and the outer decoder 1422 may be changed, and specific units among these units may be omitted.

In a structure of a signal reception apparatus in FIG. 14, a non-binary channel decoding scheme is used for receiving a signal which is modulated using an FQAM scheme, and a binary channel decoding scheme is used for receiving a signal which is modulated using a QAM scheme.

Referring to FIG. 14, the physical resource de-mapper 1402 detects a physical resource mapping signal mapped to a preset physical resource from a received signal, and outputs the physical resource mapping signal to the logical resource de-mapper 1404. The logical resource de-mapper 1404 detects a logical resource mapping signal mapped to a preset logical resource from the physical resource mapping signal, and outputs the logical resource mapping signal to the selector 1406. The selector 1406 selects a modulation scheme identical to a modulation scheme used in a signal transmission apparatus according to an indication from the signal transmission apparatus. The logical resource mapping signal is outputted to one of an FQAM path and a QAM path through the switch 1408. The FQAM path includes the symbol LLR calculator 1410 and the inner decoder 1412, and the QAM path includes the bit LLR calculator 1414.

The selector 1406 may operate as a controller which determines a modulation order(s) for a QAM scheme and/or an FSK scheme, a code rate, a repetition number, and the like, as well as a modulation order using a selection algorithm identical to a selection algorithm used in the signal transmission apparatus based on estimated channel state information and additional parameters.

If a received signal is transmitted using an FQAM scheme, the received signal is inputted to the symbol LLR calculator 1410 included in the FQAM path. The symbol LLR calculator 1410 calculates LLR values for symbols to desire to recover from the received signal according to a modulation order of the FQAM scheme, and outputs the LLR values for the symbols to the inner decoder 1412. The inner decoder 1412 recovers encoded bits by channel decoding the LLR values for the symbols according to a code rate used in an inner encoder 1312 included in the signal transmission apparatus, and outputs the recovered bits to the bit de-interleaver 1418 through the switch 1416. The inner decoder 1412 may output an encoded bit stream, soft values, or hard values.

If a received signal is transmitted using a QAM scheme, the received signal is inputted to the bit LLR calculator 1414 included in the QAM path. The bit LLR calculator 1414 calculates LLR values for bits to desire to recover from the received signal according to a modulation order of the QAM scheme, and outputs the LLR values for the bits to the bit de-interleaver 1418 through the switch 1416.

The bit de-interleaver 1418 generates de-interleaved values by de-interleaving output values which are decoded by the inner decoder 1412 or the bit LLR values which are calculated by the bit LLR calculator 1414 according to a de-interleaving pattern corresponding to an interleaving pattern used in a bit interleaver 1306 included in the signal transmission apparatus, and outputs the de-interleaved values to the rate de-matching unit 1420. The rate de-matching unit 1420 generates rate de-matched values by combining the de-interleaved values on a bit basis corresponding to a reverse operation for a rate matching operation performed in a rate matching unit 1304 included in the signal transmission apparatus, and outputs the rate de-matched values to the outer decoder 1422. The bit de-interleaver 1418 may be configured to operate by considering at least one of a code rate, and a repetition number used in the signal transmission apparatus. The rate de-matching unit 1420 operates according to the repetition number and the code rate used in the signal transmission apparatus.

The outer decoder 1422 recovers information bits by channel decoding the rate de-matched values according to a code rate used in an outer encoder 1302 included in the signal transmission apparatus.

It can be appreciated that a method and apparatus for transmitting/receiving a signal using an FQAM scheme according to an embodiment of the present disclosure may be implemented by hardware, software or a combination thereof. The software may be stored in a volatile or non-volatile storage (for example, erasable or re-writable Read Only Memory (ROM)), a memory (for example, Random Access Memory (RAM), memory chip, memory device, or memory Integrated Circuit (IC)), or an optically or magnetically recordable non-transitory machine-readable (e.g., computer-readable) storage medium (e.g., Compact Disk (CD), Digital Versatile Disk (DVD), magnetic disk, or magnetic tape). A method and apparatus for transmitting/receiving a signal using an FQAM scheme according to an embodiment of the present disclosure may be implemented by a computer or a mobile terminal that includes a controller and a memory, and the memory may be an example of a non-transitory machine-readable (e.g., computer-readable) storage medium suitable to sore a program or programs including instructions for implementing various embodiments of the present disclosure.

Therefore, the present disclosure may include a program including code for implementing the apparatus and method as defined by the appended claims, and a non-transitory machine-readable (e.g., computer-readable) storage medium storing the program. The program may be electronically transferred via any media such as communication signals which are transmitted through wired/wireless connections, and the present disclosure may include their equivalents.

As is apparent from the foregoing description, various embodiments of the present disclosure enable transmission/reception of a signal using a modulation based on a QAM scheme and an FSK scheme in a communication system.

Various embodiments of the present disclosure enable transmission/reception of a signal using a modulation based on a QAM scheme and an FSK scheme and an M-ary coding scheme in a communication system.

Various embodiments of the present disclosure enable transmission/reception of a signal by considering an interference component and using a modulation based on a QAM scheme and an FSK scheme in a communication system.

Various embodiments of the present disclosure enable transmission/reception of a signal by considering channel information and using a modulation based on a QAM scheme and an FSK scheme in a communication system.

Various embodiments of the present disclosure enable transmission/reception of a signal using a modulation based on a QAM scheme and an FSK scheme in a communication system, thereby increasing channel capacity.

Various embodiment of the present disclosure enable transmission/reception of a signal using a modulation based on a QAM scheme and an FSK scheme in a communication system, thereby increasing a data transmission rate.

Various embodiments of the present disclosure enable a sharing an interference that a signal reception apparatus experiences with at least one neighbor signal transmission apparatus and an upper entity in a communication system, thereby increasing a data transmission rate.

Various embodiments of the present disclosure enable sharing of an interference that a signal reception apparatus experiences with at least one neighbor signal transmission apparatus and an upper entity in a communication system, thereby adaptively reflecting the interference that the signal reception apparatus experiences and optimizing a signal transmission.

Various embodiments of the present disclosure enable transmission of a signal using an FQAM scheme and an M-ary CM scheme, thereby increasing transmission efficiency in a low SNR area (or a $E_b/N_0$ area).

This effect will be described with reference to FIGS. 16A to 16B.

Figure 16A:
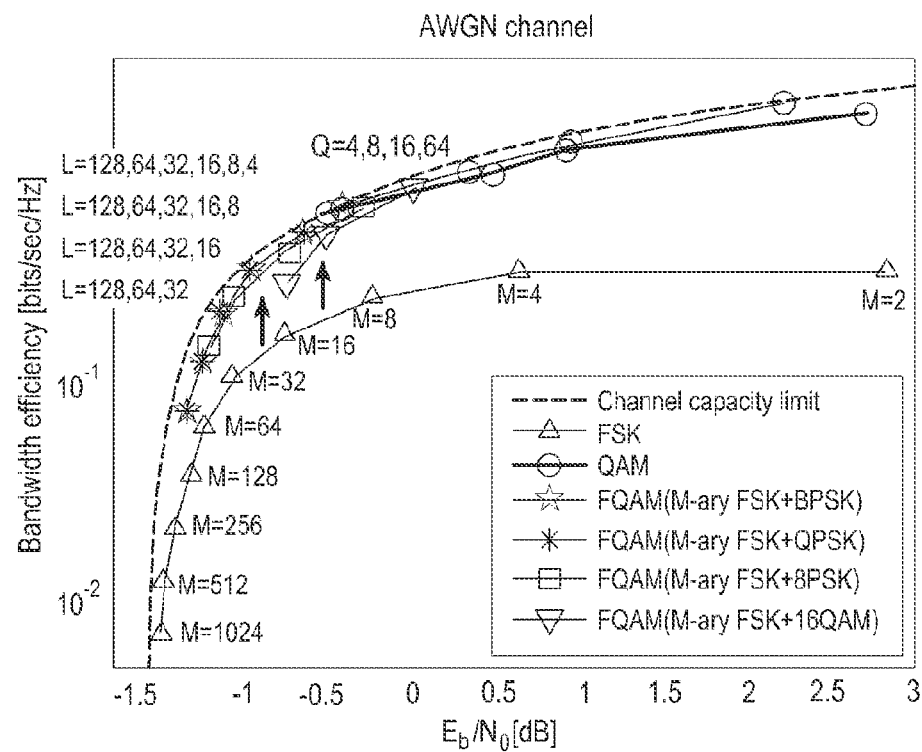
FIG. 16A is a graph illustrating a performance of each of an FSK scheme, a QAM scheme, and an FQAM scheme under a situation based on an AWGN channel and a code rate r=1/3 in a communication system according to an embodiment of the present disclosure.

FIG. 16A is a graph illustrating a performance of each of an FSK scheme, a QAM scheme, and an FQAM scheme under a situation based on an AWGN channel and a code rate r=1/3 in a communication system according to an embodiment of the present disclosure.

Referring to FIG. 16A, a graph is generated under a situation based on an AWGN channel and a code rate r=1/3, and illustrates Shanon's channel capability limit, and a performance of each of an FSK scheme, a QAM scheme, and an FQAM scheme. As illustrated in the graph of FIG. 16A, a horizontal axis denotes a ratio of noise power density to bit energy $E_b/N_0$ [dB], and a vertical axis denotes bandwidth efficiency [bits/sec/Hz].

Referring to FIG. 16A, L denotes a modulation order of the FQAM scheme, M denotes a modulation order of the FSK scheme, and Q denotes a modulation order of the QAM scheme. As described in relation to FIG. 16A, the FQAM scheme may acquire relatively high bandwidth efficiency on a relatively row $E_b/N_0$ compared to the FSK scheme and the QAM scheme.

Figure 16B:
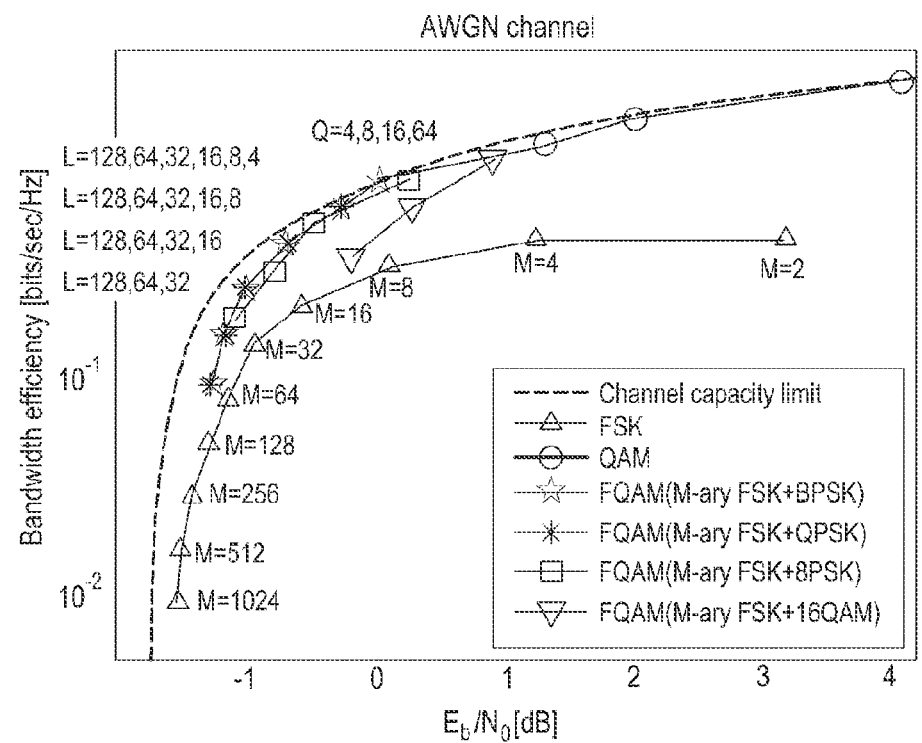
FIG. 16B is a graph illustrating a performance of each of an FSK scheme, a QAM scheme, and an FQAM scheme under a situation based on an AWGN channel and a code rate r=1/2 in a communication system according to an embodiment of the present disclosure.

FIG. 16B is a graph illustrating a performance of each of an FSK scheme, a QAM scheme, and an FQAM scheme under a situation based on an AWGN channel and a code rate r=1/2 in a communication system according to an embodiment of the present disclosure.

Referring to FIG. 16B, a graph is generated under a situation based on an AWGN channel and a code rate r=1/2, and illustrates a performance of each of an FSK scheme, a QAM scheme, and an FQAM scheme. As illustrated in the graph of FIG. 16B, a horizontal axis denotes a ratio of noise power density to bit energy $E_b/N_0$ [dB], and a vertical axis denotes bandwidth efficiency [bits/sec/Hz].

Referring to FIG. 16B, L denotes a modulation order of the FQAM scheme, M denotes a modulation order of the FSK scheme, and Q denotes a modulation order of the QAM scheme. As described in relation to FIG. 16B, the FQAM scheme may acquire relatively high bandwidth efficiency on a relatively row $E_b/N_0$ compared to the FSK scheme and the QAM scheme.

Further, various embodiments of the present disclosure enable a signal transmission apparatus to predict an interference that a signal reception apparatus experiences and share the interference experienced with at least one a neighbor signal transmission apparatus and an upper entity, thereby optimizing a transmission scheme.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a signal in a communication system, the method comprising:
   determining, in a signal transmission apparatus, each of a parameter related to a quadrature amplitude modulation (QAM) scheme and a parameter related to a frequency shift keying (FSK) scheme based on channel quality and an interference component; and
   modulating information bits, by the signal transmission apparatus, using a modulation scheme which is based on both the QAM scheme and the FSK scheme which uses the parameter related to the QAM scheme and the parameter related to the FSK scheme.

2. The method of claim 1, wherein the parameter related to the QAM scheme includes a modulation order $M_Q$ of the QAM scheme, and
   wherein the parameter related to the FSK scheme includes a modulation order $M_F$ of the FSK scheme.

3. The method of claim 2, wherein the determining of the parameter related to the QAM scheme and the parameter related to the FSK scheme based on the channel quality and the interference component comprises:
   detecting channel quality information indicating the channel quality and at least one interference component parameter indicating the interference component;
   determining candidate modulation orders $M_Q$ and $M_F$ based on a link table indicating a value for a link performance of each modulation and coding scheme level and the channel quality information; and
   determining the modulation orders $M_Q$ and $M_F$ based on a preset operating criterion, the candidate modulation orders $M_Q$ and $M_F$.

4. The method of claim 3, wherein the operating criterion includes information indicating whether a message indicating a request for changing at least one of the modulation orders $M_Q$ and $M_F$ is received from at least one neighbor signal transmission apparatus neighboring the signal transmission apparatus or an upper entity, and whether the signal transmission apparatus reflects the request for changing the at least one of the modulation orders $M_Q$ and $M_F$ if the message indicating the request for changing the at least one of the modulation orders $M_Q$ and $M_F$ is received from the at least one neighbor signal transmission apparatus or the upper entity.

5. The method of claim 3,
   wherein the at least one interference component parameter includes at least one of an interference component parameter $\alpha$, an interference component parameter $\beta$, and an interference component parameter $\delta$,
   wherein each of the interference component parameter $\alpha$ and the interference component parameter $\beta$ is generated based on statistics of remaining components except for a component which a signal reception apparatus desires to receive from a signal received in the signal reception apparatus, and
   wherein the interference component parameter $\delta$ denotes a difference between an interference statistics model calculated in the signal reception apparatus and a complex generalized Gaussian (CGG) distribution modeled based on the interference component parameter $\alpha$ and the interference component parameter $\beta$.

6. The method of claim 5, wherein each of the interference component parameter $\alpha$ and the interference component parameter $\beta$ is modeled under an assumption that an interference component on an interference channel has a CGG distribution.

7. The method of claim 6, wherein the interference component parameter $\alpha$ and the interference component parameter $\beta$ are expressed as $$\begin{cases} \alpha = \dfrac{\ln(3^6/2^{10})}{\ln\left((E[|J_l[k]|])^2/E[|J_l[k]|^2] - \dfrac{\pi}{4} + \dfrac{9}{2^{3.5}}\right) + \ln\left(\dfrac{3}{2\sqrt{2}}\right)} \\ \beta = \dfrac{\Gamma(2/\alpha)}{\Gamma(3/\alpha)} E[|J_l[k]|] \end{cases}$$

where, k denotes a symbol index, l denotes a frequency tone index, l=1, . . . , $M_F$, $$\Gamma(x) = \int_0^\infty t^{z-1} \exp(-t) dt$$

denotes a gamma function, denotes $J_l[k] = Y_l[k] - H_{1,l}[k] s[k] \eta_{m[k],l}$, and denotes components except for a component which the signal reception apparatus desires to receive in the kth symbol, $H_{1,l}[k]$ denotes channel information related to the component which the signal reception apparatus desires to receive on the lth frequency tone for the kth symbol, s[k]

denotes a transmission QAM signal for the kth symbol, $\eta_{m[k],l}$ denotes a delta function, has a value '1' if m[k] is 1, and has a value of '0' if m[k] is not 1, and m[k] denotes a frequency tone index of a frequency tone where the kth transmission symbol is transmitted.

8. The method of claim 6,
wherein the detecting of the channel quality information indicating the channel quality and the at least one interference component parameter indicating the interference component comprises receiving the channel quality information and the at least one interference component parameter from at least one signal reception apparatus, and
wherein, if the at least one signal reception apparatus includes at least two signal reception apparatuses, a value of each of specific interference component parameters α among interference component parameters α received from the at least two signal reception apparatuses is greater than a preset first threshold value, and a value of each of interference component parameters δ which are received from the at least two signal reception apparatuses is a preset first value, an interference that the at least two signal reception apparatuses experience is determined as a normal distribution.

9. The method of claim 8, further comprising:
transmitting a message which requests at least one neighbor signal transmission apparatus neighboring the signal transmission apparatus to decrease the modulation order $M_F$ to the at least one neighbor signal transmission apparatus or an upper entity.

10. The method of claim 6,
wherein the detecting of the channel quality information indicating the channel quality and the at least one interference component parameter indicating the interference component comprises receiving the channel quality information and the at least one interference component parameter from at least one signal reception apparatus, and
wherein, if the at least one signal reception apparatus includes at least two signal reception apparatuses, a value of each of specific interference component parameters α among interference component parameters α received from the at least two signal reception apparatuses is less than a second first threshold value, and a value of each of interference component parameters δ which are received from the at least two signal reception apparatuses is a preset first value, an interference that the at least two signal reception apparatuses experience is determined as the CGG distribution.

11. The method of claim 10, further comprising:
transmitting a message indicating that at least one neighbor signal transmission apparatus neighboring the signal transmission apparatus may increase the modulation order $M_F$ to the at least one neighbor signal transmission apparatus or an upper entity.

12. The method of claim 6,
wherein the detecting of the channel quality information indicating the channel quality and the at least one interference component parameter indicating the interference component comprises receiving the channel quality information and the at least one interference component parameter from at least one signal reception apparatus, and
wherein, if the at least one signal reception apparatus includes at least two signal reception apparatuses, a value of each of specific interference component parameters δ among interference component parameters δ received from the at least two signal reception apparatuses is a preset second value, an interference that the at least two signal reception apparatuses experience is not determined as the CGG distribution.

13. The method of claim 10, further comprising:
transmitting a message indicating that an interference that the at least two signal reception apparatuses experience is not the CGG distribution to an upper entity.

14. The method of claim 3, wherein the link table is a table that the channel quality information, spectral efficiency for the modulation scheme which is based on both the QAM scheme and the FSK scheme, and the modulation and coding scheme level are mapped one to one if the at least one interference component parameter is used.

15. The method of claim 3, wherein the detecting of the channel quality information indicating the channel quality and the at least one interference component parameter indicating the interference component comprises:
transmitting a message which requests a signal reception apparatus to transmit the channel quality information and the at least one interference component parameter to the signal reception apparatus; and
receiving a message including the channel quality information and the at least one interference component parameter from the signal reception apparatus.

16. The method of claim 1, further comprising:
encoding the information bits using the parameter related to the QAM scheme and the parameter related to the FSK scheme.

17. The method of claim 16,
wherein the encoding of the information bits using the parameter related to the QAM scheme and the parameter related to the FSK scheme comprises M-ary encoding the information bits if the parameter related to the QAM scheme includes a modulation order $M_Q$ and the parameter related to the FSK scheme includes a modulation order $M_F$, and
wherein the M is a value generated based on the modulation orders $M_Q$ and $M_F$.

18. A non-transitory computer-readable storage medium storing instructions that, when executed, cause at least one processor to perform the method of claim 1.

19. A signal transmission apparatus in a communication system, the signal transmission apparatus comprising:
a controller configured to determine each of a parameter related to a quadrature amplitude modulation (QAM) scheme and a parameter related to a frequency shift keying (FSK) scheme based on channel quality and an interference component; and
a transmitter configured to:
modulate information bits using a modulation scheme which based on both the QAM scheme and the FSK scheme which uses the parameter related to the QAM scheme and the parameter related to the FSK scheme, and
transmit the modulated information.

20. The signal transmission apparatus of claim 19,
wherein the parameter related to the QAM scheme includes a modulation order $M_Q$ of the QAM scheme, and
wherein the parameter related to the FSK scheme includes a modulation order $M_F$ of the FSK scheme.

21. The signal transmission apparatus of claim 20, wherein the controller is further configured to:
detect channel quality information indicating the channel quality and at least one interference component parameter indicating the interference component, determine candidate modulation orders $M_Q$ and $M_F$ based on a link table indicating a value for a link performance of each modulation and coding scheme level and the channel quality information, and determine the modulation orders $M_Q$ and $M_F$ based on a preset operating criterion, and the candidate modulation orders $M_Q$ and $M_F$.

22. The signal transmission apparatus of claim 21, wherein the operating criterion includes information indicating whether a message indicating a request for changing at least one of the modulation orders $M_Q$ and $M_F$ is received from at least one neighbor signal transmission apparatus neighboring the signal transmission apparatus or an upper entity, and whether the signal transmission apparatus reflects the request for changing the at least one of the modulation orders $M_Q$ and $M_F$ if the message indicating the request for changing the at least one of the modulation orders $M_Q$ and $M_F$ is received from the at least one neighbor signal transmission apparatus or the upper entity.

23. The signal transmission apparatus of claim 21,
wherein the at least one interference component parameter includes at least one of an interference component parameter α, an interference component parameter β, and an interference component parameter δ,
wherein each of the interference component parameter α and the interference component parameter β is generated based on statistics of remaining components except for a component which a signal reception apparatus desires to receive from a signal received in the signal reception apparatus, and
wherein the interference component parameter δ denotes a difference between an interference statistics model calculated in the signal reception apparatus and a complex generalized Gaussian (CGG) distribution modeled based on the interference component parameter α and the interference component parameter β.

24. The signal transmission apparatus of claim 23, wherein each of the interference component parameter α and the interference component parameter β is modeled under an assumption that an interference component in an interference channel has a CGG distribution.

25. The signal transmission apparatus of claim 24, wherein the interference component parameter α and the interference component parameter β are expressed as $$\begin{cases} \alpha = \dfrac{\ln(3^6/2^{10})}{\ln\left((E[|J_l[k]|])^2/E[|J_l[k]|^2] - \dfrac{\pi}{4} + \dfrac{9}{2^{3.5}}\right) + \ln\left(\dfrac{3}{2\sqrt{2}}\right)} \\ \beta = \dfrac{\Gamma(2/\alpha)}{\Gamma(3/\alpha)} E[|J_l[k]|] \end{cases}$$

where, k denotes a symbol index, l denotes a frequency tone index, $l=1, \ldots, M_F$, $$\Gamma(x) = \int_0^\infty t^{x-1} \exp(-t) dt$$

denotes a gamma function, denotes $J_l[k] = Y_l[k] - H_{1,l}[k]s[k] \eta_{m[k],l}$, and denotes components except for a component which the signal reception apparatus desires to receive in the kth symbol, $H_{1,l}[k]$ denotes channel information related to the component which the signal reception apparatus desires to receive on the lth frequency tone for the kth symbol, s[k] denotes a transmission QAM signal for the kth symbol, $\eta_{m[k],l}$ denotes a delta function, has a value '1' if m[k] is 1, and has a value of '0' if m[k] is not 1, and m[k] denotes a frequency tone index of a frequency tone where the kth transmission symbol is transmitted.

26. The signal transmission apparatus of claim 24, further comprising:
a receiver configured to receive the channel quality information and the at least one interference component parameter from at least one signal reception apparatus,
wherein, if the at least one signal reception apparatus includes at least two signal reception apparatuses, a value of each of specific interference component parameters α among interference component parameters α received from the at least two signal reception apparatuses is greater than a preset first threshold value, and a value of each of interference component parameters δ which are received from the at least two signal reception apparatuses is a preset first value, an interference that the at least two signal reception apparatuses experience is determined as a normal distribution.

27. The signal transmission apparatus of claim 26, wherein the transmitter is configured to transmit a message which requests at least one neighbor signal transmission apparatus neighboring the signal transmission apparatus to decrease the modulation order $M_F$ to the at least one neighbor signal transmission apparatus or an upper entity.

28. The signal transmission apparatus of claim 24, further comprising:
a receiver configured to receive the channel quality information and the at least one interference component parameter from at least one signal reception apparatus, and
wherein, if the at least one signal reception apparatus includes at least two signal reception apparatuses, a value of each of specific interference component parameters α among interference component parameters α received from the at least two signal reception apparatuses is less than a second first threshold value, and a value of each of interference component parameters δ which are received from the at least two signal reception apparatuses is a preset first value, an interference that the at least two signal reception apparatuses experience is determined as the CGG distribution.

29. The signal transmission apparatus of claim 28, wherein the transmitter transmits a message indicating that at least one neighbor signal transmission apparatus neighboring the signal transmission apparatus may increase the modulation order $M_F$ to the at least one neighbor signal transmission apparatus or an upper entity.

30. The signal transmission apparatus of claim 24, further comprising:
a receiver configured to receive the channel quality information and the at least one interference component parameter from at least one signal reception apparatus,
wherein, if the at least one signal reception apparatus includes at least two signal reception apparatuses, a value of each of specific interference component parameters δ among interference component parameters δ received from the at least two signal reception apparatuses is a preset second value, an interference that the at least two signal reception apparatuses experience is not determined as the CGG distribution.

31. The signal transmission apparatus of claim 28, wherein the transmitter is configured to transmit a message indicating that an interference that the at least two signal reception apparatuses experience is not the CGG distribution to an upper entity.

32. The signal transmission apparatus of claim 21, wherein the link table is a table that the channel quality information, spectral efficiency for the modulation scheme which is based on both the QAM scheme and the FSK scheme, and the modulation and coding scheme level are mapped one to one if the at least one interference component parameter is used.

33. The signal transmission apparatus of claim 21, further comprising:

a receiver, wherein the transmitter is configured to transmit a message which requests a signal reception apparatus to transmit the channel quality information and the at least one interference component parameter to the signal reception apparatus, and wherein the receiver is configured to receive a message including the channel quality information and the at least one interference component parameter from the signal reception apparatus.

34. The signal transmission apparatus of claim 19, wherein the transmitter is configured to encode the information bits using the parameter related to the QAM scheme and the parameter related to the FSK scheme.

35. The signal transmission apparatus of claim 34, wherein the transmitter is configured to encode the information bits using the parameter related to the QAM scheme and the parameter related to the FSK scheme based on M-ary encoding the information bits if the parameter related to the QAM scheme includes a modulation order $M_Q$ and the parameter related to the FSK scheme includes a modulation order $M_F$, and wherein the M is a value generated based on the modulation orders $M_Q$ and $M_F$.

* * * * *